(12) United States Patent
Curtis et al.

(10) Patent No.: US 9,410,814 B2
(45) Date of Patent: *Aug. 9, 2016

(54) PASSIVE CROWD-SOURCED MAP UPDATES AND ALTERNATE ROUTE RECOMMENDATIONS

(71) Applicant: Waldeck Technology, LLC, Wilmington, DE (US)

(72) Inventors: Scott Curtis, Durham, NC (US); Eric P. Halber, Morrisville, NC (US); Gregory M. Evans, Raleigh, NC (US); Steven L. Petersen, Los Gatos, CA (US)

(73) Assignee: Waldeck Technology, LLC, Wilmington, DE (US)

(*) Notice: Subject to any disclaimer, the term of this patent is extended or adjusted under 35 U.S.C. 154(b) by 0 days.

This patent is subject to a terminal disclaimer.

(21) Appl. No.: 14/851,341

(22) Filed: Sep. 11, 2015

(65) Prior Publication Data

US 2016/0003634 A1 Jan. 7, 2016

Related U.S. Application Data

(63) Continuation of application No. 14/135,659, filed on Dec. 20, 2013, now Pat. No. 9,140,566, which is a continuation of application No. 12/731,242, filed on Mar. 25, 2010, now Pat. No. 8,620,532.

(60) Provisional application No. 61/163,091, filed on Mar. 25, 2009.

(51) Int. Cl.
*G06F 19/00* (2011.01)
*G01C 21/34* (2006.01)
(Continued)

(52) U.S. Cl.
CPC .............. *G01C 21/34* (2013.01); *G01C 21/00* (2013.01); *G06N 5/04* (2013.01); *G06Q 30/0282* (2013.01); *H04W 4/02* (2013.01); *H04W 4/028* (2013.01); *H04W 12/02* (2013.01)

(58) Field of Classification Search
CPC ....... G06Q 10/10; G06Q 10/08; G06Q 30/02; G06Q 10/06; G06F 17/30

USPC ............ 701/1.1, 2, 3, 4, 7.11, 7.14, 7.42, 35, 701/322, 999.01, 999.104; 379/93.02, 379/211.02; 709/224, 247; 370/401; 707/999.102

See application file for complete search history.

(56) References Cited

U.S. PATENT DOCUMENTS

| 5,177,685 A | 1/1993 | Davis et al. |
| 5,220,507 A | 6/1993 | Kirson |

(Continued)

FOREIGN PATENT DOCUMENTS

| CN | 1776684 | 5/2006 |
| CN | 101118162 | 2/2008 |

(Continued)

OTHER PUBLICATIONS

MacArthur, Amanda, "21 iPhone Food Apps to Eat Your Heart Out," at <http://mashable.com/2008/08/13/iphone-food-apps/>, Aug. 13, 2008, 11 pages.

(Continued)

*Primary Examiner* — Mcdieunel Marc

(57) ABSTRACT

The claimed subject matter is directed to systems and methods for providing passive crowd-sourced alternate route recommendations. In one embodiment, locations of users of a number of mobile location-aware devices are tracked over time. Upon receiving a request, users of mobile location-aware devices that have traveled from a desired start location to a desired stop location are identified. At least one of the different routes taken by one or more users from the desired start location to the desired stop location is provided to the requestor as at least one recommended alternate route. The different routes taken by the one or more users from the desired start location to the desired stop location include routes taken that begin before the desired start location and go through the start location and routes taken that stop beyond the desired stop location and go through the desired stop location.

27 Claims, 11 Drawing Sheets

(51) Int. Cl.
*G06Q 30/02* (2012.01)
*H04W 4/02* (2009.01)
*G06N 5/04* (2006.01)
*G01C 21/00* (2006.01)
*H04W 12/02* (2009.01)

(56) References Cited

U.S. PATENT DOCUMENTS

| | | |
|---|---|---|
| 5,371,678 A | 12/1994 | Nomura |
| 5,452,212 A | 9/1995 | Yokoyama |
| 5,493,692 A | 2/1996 | Theimer et al. |
| 5,528,501 A | 6/1996 | Hanson |
| 5,539,232 A | 7/1996 | Nakanishi et al. |
| 5,659,476 A | 8/1997 | LeFebvre et al. |
| 5,682,525 A | 10/1997 | Bouve et al. |
| 5,729,457 A | 3/1998 | Seymour |
| 5,748,148 A | 5/1998 | Heiser et al. |
| 5,754,939 A | 5/1998 | Herz et al. |
| 5,790,976 A | 8/1998 | Boll et al. |
| 5,796,727 A | 8/1998 | Harrison et al. |
| 5,802,492 A | 9/1998 | DeLorme et al. |
| 5,812,134 A | 9/1998 | Pooser et al. |
| 5,848,373 A | 12/1998 | DeLorme |
| 5,903,901 A | 5/1999 | Kawakura et al. |
| 5,949,776 A | 9/1999 | Mahany et al. |
| 5,987,380 A | 11/1999 | Backman et al. |
| 6,014,090 A | 1/2000 | Rosen et al. |
| 6,023,241 A | 2/2000 | Clapper |
| 6,047,235 A | 4/2000 | Hiyokawa et al. |
| 6,049,711 A | 4/2000 | Ben-Yehezkel et al. |
| 6,067,499 A | 5/2000 | Yagyu et al. |
| 6,072,409 A | 6/2000 | Fushimi et al. |
| 6,088,717 A | 7/2000 | Reed et al. |
| 6,098,015 A | 8/2000 | Nimura et al. |
| 6,124,826 A | 9/2000 | Garthwaite et al. |
| 6,127,945 A | 10/2000 | Mura-Smith |
| 6,179,252 B1 * | 1/2001 | Roop ............... B61L 29/18 246/122 R |
| 6,199,014 B1 | 3/2001 | Walker et al. |
| 6,204,844 B1 | 3/2001 | Fumarolo et al. |
| 6,212,474 B1 | 4/2001 | Fowler et al. |
| 6,240,069 B1 | 5/2001 | Alperovich et al. |
| 6,249,742 B1 | 6/2001 | Friederich |
| 6,278,941 B1 | 8/2001 | Yokoyama |
| 6,282,492 B1 | 8/2001 | Gorai et al. |
| 6,285,950 B1 | 9/2001 | Tanimoto |
| 6,321,158 B1 | 11/2001 | DeLorme et al. |
| 6,324,467 B1 | 11/2001 | Machii et al. |
| 6,334,086 B1 | 12/2001 | Park et al. |
| 6,339,746 B1 | 1/2002 | Sugiyama et al. |
| 6,349,203 B1 | 2/2002 | Asaoka et al. |
| 6,359,896 B1 | 3/2002 | Baker et al. |
| 6,363,392 B1 | 3/2002 | Halstead et al. |
| 6,366,856 B1 | 4/2002 | Johnson |
| 6,408,301 B1 | 6/2002 | Patton et al. |
| 6,415,226 B1 | 7/2002 | Kozak |
| 6,424,819 B1 | 7/2002 | Yan |
| 6,430,498 B1 | 8/2002 | Maruyama et al. |
| 6,434,579 B1 | 8/2002 | Shaffer et al. |
| 6,459,987 B1 | 10/2002 | Krull et al. |
| 6,466,938 B1 | 10/2002 | Goldberg |
| 6,477,526 B2 | 11/2002 | Hayashi et al. |
| 6,480,783 B1 | 11/2002 | Myr |
| 6,484,092 B2 | 11/2002 | Seibel |
| 6,490,587 B2 | 12/2002 | Easty et al. |
| 6,502,102 B1 | 12/2002 | Haswell et al. |
| 6,505,118 B2 | 1/2003 | Chowanic |
| 6,510,379 B1 | 1/2003 | Hasegawa et al. |
| 6,523,046 B2 | 2/2003 | Liu et al. |
| 6,526,349 B2 | 2/2003 | Bullock et al. |
| 6,529,136 B2 | 3/2003 | Cao et al. |
| 6,535,868 B1 | 3/2003 | Galeazzi et al. |
| 6,539,080 B1 | 3/2003 | Bruce et al. |
| 6,539,232 B2 | 3/2003 | Hendrey et al. |
| 6,542,749 B2 | 4/2003 | Tanaka et al. |
| 6,542,750 B2 | 4/2003 | Hendrey et al. |
| 6,546,336 B1 | 4/2003 | Matsuoka et al. |
| 6,549,768 B1 | 4/2003 | Fraccaroli |
| 6,567,743 B1 | 5/2003 | Mueller et al. |
| 6,577,949 B1 | 6/2003 | Robinson et al. |
| 6,580,999 B2 | 6/2003 | Maruyama et al. |
| 6,611,754 B2 | 8/2003 | Klein |
| 6,618,593 B1 | 9/2003 | Drutman et al. |
| 6,629,100 B2 | 9/2003 | Morris et al. |
| 6,629,104 B1 | 9/2003 | Parulski et al. |
| 6,633,812 B1 | 10/2003 | Martin et al. |
| 6,654,681 B1 | 11/2003 | Kiendl et al. |
| 6,662,105 B1 | 12/2003 | Tada et al. |
| 6,675,015 B1 | 1/2004 | Martini et al. |
| 6,675,268 B1 | 1/2004 | DeKoning et al. |
| 6,694,252 B2 | 2/2004 | Ukita |
| 6,704,118 B1 | 3/2004 | Hull et al. |
| 6,708,172 B1 | 3/2004 | Wong et al. |
| 6,708,186 B1 | 3/2004 | Claborn et al. |
| 6,721,650 B2 | 4/2004 | Fushiki et al. |
| 6,721,653 B2 | 4/2004 | Watanabe |
| 6,721,747 B2 | 4/2004 | Lipkin |
| 6,735,583 B1 | 5/2004 | Bjarnestam |
| 6,748,317 B2 | 6/2004 | Maruyama et al. |
| 6,757,684 B2 | 6/2004 | Svendsen et al. |
| 6,762,696 B2 | 7/2004 | Hulverscheidt et al. |
| 6,765,998 B2 | 7/2004 | Bruce et al. |
| 6,766,245 B2 | 7/2004 | Padmanabhan |
| 6,778,903 B2 | 8/2004 | Robinson et al. |
| 6,810,323 B1 | 10/2004 | Bullock et al. |
| 6,813,502 B2 | 11/2004 | Son et al. |
| 6,819,783 B2 | 11/2004 | Goldberg et al. |
| 6,819,919 B1 | 11/2004 | Tanaka |
| 6,820,005 B2 | 11/2004 | Matsuda et al. |
| 6,853,841 B1 | 2/2005 | St. Pierre |
| 6,876,642 B1 | 4/2005 | Adams et al. |
| 6,883,019 B1 | 4/2005 | Sengupta et al. |
| 6,895,329 B1 | 5/2005 | Wolfson |
| 6,920,455 B1 | 7/2005 | Weschler |
| 6,937,860 B2 | 8/2005 | Jahn |
| 6,947,571 B1 | 9/2005 | Rhoads et al. |
| 6,954,443 B2 | 10/2005 | Forstadius et al. |
| 6,961,658 B2 | 11/2005 | Ohler |
| 6,968,179 B1 | 11/2005 | De Vries |
| 6,970,703 B2 | 11/2005 | Fuchs et al. |
| 6,975,266 B2 | 12/2005 | Abraham et al. |
| 6,987,885 B2 | 1/2006 | Gonzalez-Banos et al. |
| 6,990,497 B2 | 1/2006 | O'Rourke et al. |
| 7,020,710 B2 | 3/2006 | Weber et al. |
| 7,035,618 B2 | 4/2006 | Schnurr |
| 7,035,912 B2 | 4/2006 | Arteaga |
| 7,047,315 B1 | 5/2006 | Srivastava |
| 7,071,842 B1 | 7/2006 | Brady, Jr. |
| 7,085,571 B2 | 8/2006 | Kalhan et al. |
| 7,096,233 B2 | 8/2006 | Mori et al. |
| 7,110,592 B2 | 9/2006 | Kotake et al. |
| 7,116,985 B2 | 10/2006 | Wilson et al. |
| 7,117,254 B2 | 10/2006 | Lunt et al. |
| 7,123,189 B2 | 10/2006 | Lalik et al. |
| 7,123,918 B1 | 10/2006 | Goodman |
| 7,124,164 B1 | 10/2006 | Chemtob |
| 7,130,740 B2 | 10/2006 | Vanegas et al. |
| 7,134,040 B2 | 11/2006 | Ayres |
| 7,149,625 B2 | 12/2006 | Mathews et al. |
| 7,158,798 B2 | 1/2007 | Lee et al. |
| 7,158,876 B2 | 1/2007 | Crook |
| 7,167,910 B2 | 1/2007 | Farnham et al. |
| 7,171,018 B2 | 1/2007 | Rhoads et al. |
| 7,200,638 B2 | 4/2007 | Lake |
| 7,203,753 B2 | 4/2007 | Yeager et al. |
| 7,206,568 B2 | 4/2007 | Sudit |
| 7,218,611 B2 | 5/2007 | Mimura et al. |
| 7,231,293 B2 | 6/2007 | Lapstun et al. |
| 7,234,117 B2 | 6/2007 | Zaner et al. |
| 7,236,739 B2 | 6/2007 | Chang |
| 7,236,799 B2 | 6/2007 | Wilson et al. |
| 7,239,960 B2 | 7/2007 | Yokota et al. |
| 7,240,106 B2 | 7/2007 | Cochran et al. |
| 7,243,134 B2 | 7/2007 | Bruner et al. |

(56) References Cited

U.S. PATENT DOCUMENTS

| | | |
|---|---|---|
| 7,247,024 B2 | 7/2007 | Bright et al. |
| 7,248,841 B2 | 7/2007 | Agee et al. |
| 7,249,123 B2 | 7/2007 | Elder et al. |
| 7,249,367 B2 | 7/2007 | Bove, Jr. et al. |
| 7,254,406 B2 | 8/2007 | Beros et al. |
| 7,260,638 B2 | 8/2007 | Crosbie |
| 7,269,590 B2 | 9/2007 | Hull et al. |
| 7,269,854 B2 | 9/2007 | Simmons et al. |
| 7,271,742 B2 | 9/2007 | Sheha et al. |
| 7,272,357 B2 | 9/2007 | Nishiga et al. |
| 7,280,822 B2 | 10/2007 | Fraccaroli |
| 7,283,628 B2 | 10/2007 | Stein et al. |
| 7,319,379 B1 | 1/2008 | Melvin |
| 7,333,820 B2 | 2/2008 | Sheha et al. |
| 7,333,889 B2 | 2/2008 | Hashizume |
| 7,336,928 B2 | 2/2008 | Paalasmaa et al. |
| 7,340,768 B2 | 3/2008 | Rosenberger |
| 7,343,160 B2 | 3/2008 | Morton |
| 7,359,724 B2 | 4/2008 | Torvinen |
| 7,359,894 B1 | 4/2008 | Liebman et al. |
| 7,373,109 B2 | 5/2008 | Pohja et al. |
| 7,386,318 B2 | 6/2008 | Moon et al. |
| 7,392,130 B1 * | 6/2008 | Rosen .............. G08G 1/20 340/905 |
| 7,398,081 B2 | 7/2008 | Moran |
| 7,423,580 B2 | 9/2008 | Markhovsky et al. |
| 7,424,363 B2 | 9/2008 | Cheng et al. |
| 7,444,237 B2 | 10/2008 | Dale |
| 7,444,655 B2 | 10/2008 | Sardera |
| 7,509,093 B2 | 3/2009 | Persson et al. |
| 7,509,131 B2 | 3/2009 | Krumm et al. |
| 7,512,702 B1 | 3/2009 | Srivastava et al. |
| 7,516,212 B2 | 4/2009 | Nguyen et al. |
| 7,538,691 B2 | 5/2009 | Horstemeyer |
| 7,558,404 B2 | 7/2009 | Ma et al. |
| 7,590,486 B2 | 9/2009 | Okude et al. |
| 7,593,809 B2 * | 9/2009 | Rosen .............. G08G 1/20 340/905 |
| 7,617,542 B2 | 11/2009 | Vataja |
| 7,620,404 B2 | 11/2009 | Chesnais et al. |
| 7,624,024 B2 | 11/2009 | Levis et al. |
| 7,630,986 B1 | 12/2009 | Herz et al. |
| 7,680,959 B2 | 3/2010 | Svendsen |
| 7,684,815 B2 | 3/2010 | Counts et al. |
| 7,694,156 B2 | 4/2010 | Gammel et al. |
| 7,698,061 B2 | 4/2010 | Singh |
| 7,702,456 B2 | 4/2010 | Singh |
| 7,706,280 B2 | 4/2010 | Raciborski et al. |
| 7,729,947 B1 | 6/2010 | Philbin et al. |
| 7,787,886 B2 | 8/2010 | Markhovsky et al. |
| 7,809,500 B2 | 10/2010 | Couckuyt et al. |
| 7,840,224 B2 | 11/2010 | Vengroff et al. |
| 7,874,521 B2 | 1/2011 | Shuster |
| 7,881,945 B2 * | 2/2011 | Schmitt ............ G06Q 10/10 705/1.1 |
| 7,890,871 B2 | 2/2011 | Etkin |
| 7,912,642 B2 | 3/2011 | Zhao et al. |
| 7,917,154 B2 | 3/2011 | Fortescue et al. |
| 7,991,548 B2 | 8/2011 | Singh |
| 8,000,726 B2 | 8/2011 | Altman et al. |
| 8,010,601 B2 | 8/2011 | Jennings et al. |
| 8,073,140 B2 | 12/2011 | Shirai et al. |
| 8,208,943 B2 | 6/2012 | Petersen et al. |
| 8,224,353 B2 | 7/2012 | Wright et al. |
| 8,249,807 B1 | 8/2012 | Barbeau et al. |
| 8,321,509 B2 | 11/2012 | Jennings et al. |
| 8,401,771 B2 | 3/2013 | Krumm et al. |
| 8,417,266 B2 | 4/2013 | Kim et al. |
| 8,473,729 B2 | 6/2013 | Tretheway et al. |
| 8,495,065 B2 | 7/2013 | Petersen et al. |
| 8,589,330 B2 | 11/2013 | Petersen et al. |
| 8,620,532 B2 * | 12/2013 | Curtis ............ G06Q 30/0282 370/401 |
| 8,620,566 B2 * | 12/2013 | Ueno .................. B60K 6/48 180/65.21 |
| 8,825,074 B2 | 9/2014 | Petersen et al. |
| 2001/0013009 A1 | 8/2001 | Greening et al. |
| 2001/0019309 A1 | 9/2001 | Saeki et al. |
| 2001/0029182 A1 | 10/2001 | McCann et al. |
| 2001/0029425 A1 | 10/2001 | Myr |
| 2001/0039659 A1 | 11/2001 | Simmons et al. |
| 2001/0044310 A1 | 11/2001 | Lincke |
| 2001/0047241 A1 | 11/2001 | Khavakh et al. |
| 2001/0048449 A1 | 12/2001 | Baker |
| 2001/0056325 A1 | 12/2001 | Pu et al. |
| 2002/0049690 A1 | 4/2002 | Takano |
| 2002/0062368 A1 | 5/2002 | Holtzman et al. |
| 2002/0069192 A1 | 6/2002 | Aegerter |
| 2002/0070862 A1 | 6/2002 | Francis et al. |
| 2002/0086659 A1 | 7/2002 | Lauper |
| 2002/0086676 A1 | 7/2002 | Hendrey et al. |
| 2002/0087335 A1 | 7/2002 | Meyers et al. |
| 2002/0099737 A1 | 7/2002 | Porter et al. |
| 2002/0111813 A1 | 8/2002 | Capps |
| 2002/0120396 A1 | 8/2002 | Boies et al. |
| 2002/0128773 A1 | 9/2002 | Chowanic et al. |
| 2002/0152020 A1 | 10/2002 | Seibel |
| 2002/0156572 A1 | 10/2002 | Bullock et al. |
| 2002/0165662 A1 | 11/2002 | Maruyama et al. |
| 2003/0006911 A1 | 1/2003 | Smith et al. |
| 2003/0014397 A1 | 1/2003 | Chau et al. |
| 2003/0018607 A1 | 1/2003 | Lennon et al. |
| 2003/0020623 A1 | 1/2003 | Cao et al. |
| 2003/0022675 A1 | 1/2003 | Mergler |
| 2003/0044021 A1 | 3/2003 | Wilkinson et al. |
| 2003/0050062 A1 | 3/2003 | Chen et al. |
| 2003/0055558 A1 | 3/2003 | Watanabe et al. |
| 2003/0055614 A1 | 3/2003 | Pelikan et al. |
| 2003/0065663 A1 | 4/2003 | Chu |
| 2003/0065721 A1 | 4/2003 | Roskind |
| 2003/0078840 A1 | 4/2003 | Strunk et al. |
| 2003/0080868 A1 | 5/2003 | Nelson |
| 2003/0105585 A1 | 6/2003 | Ukita |
| 2003/0109985 A1 | 6/2003 | Kotzin |
| 2003/0126100 A1 | 7/2003 | Chithambaram |
| 2003/0126212 A1 | 7/2003 | Morris |
| 2003/0144794 A1 | 7/2003 | Schuessler |
| 2003/0158855 A1 | 8/2003 | Farnham et al. |
| 2003/0163333 A1 | 8/2003 | Podgurny et al. |
| 2003/0182052 A1 | 9/2003 | DeLorme et al. |
| 2003/0191584 A1 | 10/2003 | Robinson et al. |
| 2003/0195695 A1 | 10/2003 | Maruyama et al. |
| 2003/0229549 A1 | 12/2003 | Wolinsky et al. |
| 2004/0009750 A1 | 1/2004 | Beros et al. |
| 2004/0025185 A1 | 2/2004 | Goci et al. |
| 2004/0054428 A1 | 3/2004 | Sheha et al. |
| 2004/0106415 A1 | 6/2004 | Maeda et al. |
| 2004/0107219 A1 | 6/2004 | Rosenberger |
| 2004/0117110 A1 | 6/2004 | Sasajima |
| 2004/0148393 A1 | 7/2004 | Breiter et al. |
| 2004/0158393 A1 | 8/2004 | Oonishi et al. |
| 2004/0160307 A1 | 8/2004 | Saikkonen et al. |
| 2004/0172191 A1 | 9/2004 | Vitikainen |
| 2004/0181668 A1 | 9/2004 | Blew et al. |
| 2004/0186661 A1 | 9/2004 | Barton |
| 2004/0192331 A1 | 9/2004 | Gorday et al. |
| 2004/0192339 A1 | 9/2004 | Wilson et al. |
| 2004/0196163 A1 | 10/2004 | Takenaga et al. |
| 2004/0203902 A1 | 10/2004 | Wilson et al. |
| 2004/0203903 A1 | 10/2004 | Wilson et al. |
| 2004/0224702 A1 | 11/2004 | Chaskar |
| 2004/0225436 A1 | 11/2004 | Yoshihashi |
| 2004/0225519 A1 | 11/2004 | Martin |
| 2005/0015197 A1 | 1/2005 | Ohtsuji et al. |
| 2005/0015432 A1 | 1/2005 | Cohen |
| 2005/0015800 A1 | 1/2005 | Holcomb |
| 2005/0021369 A1 | 1/2005 | Cohen et al. |
| 2005/0027442 A1 | 2/2005 | Kelley et al. |
| 2005/0033780 A1 | 2/2005 | Simelius et al. |
| 2005/0038876 A1 | 2/2005 | Chaudhuri |
| 2005/0043881 A1 | 2/2005 | Brulle-Drews et al. |
| 2005/0050027 A1 | 3/2005 | Yeh et al. |
| 2005/0059379 A1 | 3/2005 | Sovio et al. |
| 2005/0060088 A1 | 3/2005 | Helal et al. |

(56) References Cited

U.S. PATENT DOCUMENTS

| | | |
|---|---|---|
| 2005/0060350 A1 | 3/2005 | Baum et al. |
| 2005/0064864 A1 | 3/2005 | Horton et al. |
| 2005/0070298 A1 | 3/2005 | Caspi et al. |
| 2005/0071221 A1 | 3/2005 | Selby |
| 2005/0080556 A1 | 4/2005 | Toelle |
| 2005/0096840 A1 | 5/2005 | Simske |
| 2005/0102098 A1 | 5/2005 | Montealegre et al. |
| 2005/0102101 A1 | 5/2005 | Beesley et al. |
| 2005/0130634 A1 | 6/2005 | Godfrey |
| 2005/0131628 A1 | 6/2005 | Peeters |
| 2005/0143097 A1 | 6/2005 | Wilson et al. |
| 2005/0160270 A1 | 7/2005 | Goldberg et al. |
| 2005/0174975 A1 | 8/2005 | Mgrdechian et al. |
| 2005/0192742 A1 | 9/2005 | Okochi |
| 2005/0197846 A1 | 9/2005 | Pezaris et al. |
| 2005/0198305 A1 | 9/2005 | Pezaris et al. |
| 2005/0209773 A1 | 9/2005 | Hara |
| 2005/0210387 A1 | 9/2005 | Alagappan et al. |
| 2005/0231425 A1 | 10/2005 | Coleman et al. |
| 2005/0245233 A1 | 11/2005 | Anderson |
| 2005/0246095 A1 | 11/2005 | Banet et al. |
| 2005/0251453 A1 | 11/2005 | Lu |
| 2005/0251565 A1 | 11/2005 | Weel |
| 2005/0251807 A1 | 11/2005 | Weel |
| 2005/0256635 A1 | 11/2005 | Gardner et al. |
| 2005/0256813 A1 | 11/2005 | Bahbouh et al. |
| 2005/0272413 A1 | 12/2005 | Bourne |
| 2005/0278371 A1 | 12/2005 | Funk et al. |
| 2005/0288859 A1 | 12/2005 | Golding |
| 2006/0004512 A1 | 1/2006 | Herbst et al. |
| 2006/0004713 A1 | 1/2006 | Korte et al. |
| 2006/0009907 A1 | 1/2006 | Kuroda et al. |
| 2006/0015249 A1 | 1/2006 | Gieseke |
| 2006/0031007 A1 | 2/2006 | Agnew et al. |
| 2006/0036363 A1 | 2/2006 | Crook |
| 2006/0036457 A1 | 2/2006 | McNamara |
| 2006/0046740 A1 | 3/2006 | Johnson |
| 2006/0046743 A1 | 3/2006 | Mirho |
| 2006/0047568 A1 | 3/2006 | Eisenberg et al. |
| 2006/0048059 A1 | 3/2006 | Etkin |
| 2006/0069500 A1 | 3/2006 | Hashizume |
| 2006/0069503 A1 | 3/2006 | Suomela et al. |
| 2006/0080029 A1 | 4/2006 | Kodani et al. |
| 2006/0080034 A1 | 4/2006 | Hayashi |
| 2006/0082472 A1 | 4/2006 | Adachi et al. |
| 2006/0085419 A1 | 4/2006 | Rosen |
| 2006/0085821 A9 | 4/2006 | Simmons et al. |
| 2006/0112067 A1 | 5/2006 | Morris |
| 2006/0112141 A1 | 5/2006 | Morris |
| 2006/0129308 A1 | 6/2006 | Kates |
| 2006/0149461 A1 | 7/2006 | Rowley et al. |
| 2006/0149628 A1 | 7/2006 | Chefalas et al. |
| 2006/0149631 A1 | 7/2006 | Brazell et al. |
| 2006/0161599 A1 | 7/2006 | Rosen |
| 2006/0166679 A1 | 7/2006 | Karaoguz et al. |
| 2006/0168264 A1 | 7/2006 | Baba et al. |
| 2006/0184313 A1 | 8/2006 | Butler |
| 2006/0203804 A1 | 9/2006 | Whitmore et al. |
| 2006/0217879 A1 | 9/2006 | Ikeuchi et al. |
| 2006/0218225 A1 | 9/2006 | Hee Voon et al. |
| 2006/0223518 A1 | 10/2006 | Haney |
| 2006/0227047 A1 | 10/2006 | Rosenberg |
| 2006/0229058 A1 | 10/2006 | Rosenberg |
| 2006/0229802 A1 | 10/2006 | Vertelney et al. |
| 2006/0229939 A1 | 10/2006 | Bhakta et al. |
| 2006/0238409 A1 | 10/2006 | Yoshioka et al. |
| 2006/0240856 A1 | 10/2006 | Counts et al. |
| 2006/0247849 A1 | 11/2006 | Mohsini et al. |
| 2006/0247852 A1 | 11/2006 | Kortge et al. |
| 2006/0256959 A1 | 11/2006 | Hymes |
| 2006/0265119 A1 | 11/2006 | McMahan et al. |
| 2006/0265121 A1 | 11/2006 | Kuo et al. |
| 2006/0266830 A1 | 11/2006 | Horozov et al. |
| 2006/0270419 A1 | 11/2006 | Crowley et al. |
| 2006/0287815 A1 | 12/2006 | Gluck |
| 2007/0005419 A1 | 1/2007 | Horvitz et al. |
| 2007/0008129 A1 | 1/2007 | Soliman |
| 2007/0015518 A1 | 1/2007 | Winter et al. |
| 2007/0030824 A1 | 2/2007 | Ribaudo et al. |
| 2007/0032242 A1 | 2/2007 | Goodman |
| 2007/0032942 A1 | 2/2007 | Thota |
| 2007/0037574 A1 | 2/2007 | Libov et al. |
| 2007/0050129 A1 | 3/2007 | Salmre |
| 2007/0073937 A1 | 3/2007 | Feinberg et al. |
| 2007/0075898 A1 | 4/2007 | Markhovsky et al. |
| 2007/0078596 A1 | 4/2007 | Grace |
| 2007/0083428 A1 | 4/2007 | Goldstein |
| 2007/0093955 A1 | 4/2007 | Hughes |
| 2007/0118278 A1 | 5/2007 | Finn et al. |
| 2007/0121843 A1 | 5/2007 | Atazky et al. |
| 2007/0124157 A1 | 5/2007 | Laumeyer et al. |
| 2007/0135138 A1 | 6/2007 | Brown et al. |
| 2007/0136132 A1 | 6/2007 | Weiser et al. |
| 2007/0142065 A1 | 6/2007 | Richey et al. |
| 2007/0149214 A1 | 6/2007 | Walsh et al. |
| 2007/0150444 A1 | 6/2007 | Chesnais et al. |
| 2007/0155416 A1 | 7/2007 | Donnellan |
| 2007/0159299 A1 | 7/2007 | Tsai |
| 2007/0167174 A1 | 7/2007 | Halcrow et al. |
| 2007/0168208 A1 | 7/2007 | Aikas et al. |
| 2007/0168254 A1 | 7/2007 | Steelberg et al. |
| 2007/0168888 A1 | 7/2007 | Jawerth |
| 2007/0174243 A1 | 7/2007 | Fritz |
| 2007/0186007 A1 | 8/2007 | Field et al. |
| 2007/0202844 A1 | 8/2007 | Wilson et al. |
| 2007/0203644 A1 | 8/2007 | Thota et al. |
| 2007/0205276 A1 | 9/2007 | Sodan et al. |
| 2007/0218867 A1 | 9/2007 | Mononen et al. |
| 2007/0218900 A1 | 9/2007 | Abhyanker |
| 2007/0237096 A1 | 10/2007 | Vengroff et al. |
| 2007/0244633 A1 | 10/2007 | Phillips et al. |
| 2007/0250476 A1 | 10/2007 | Krasnik |
| 2007/0255785 A1 | 11/2007 | Hayashi et al. |
| 2007/0255831 A1 | 11/2007 | Hayashi et al. |
| 2007/0260393 A1 | 11/2007 | Abernethy et al. |
| 2007/0271136 A1 | 11/2007 | Strauss et al. |
| 2007/0282621 A1 | 12/2007 | Altman et al. |
| 2008/0004043 A1 | 1/2008 | Wilson et al. |
| 2008/0016018 A1 | 1/2008 | Malik |
| 2008/0016205 A1 | 1/2008 | Svendsen |
| 2008/0027643 A1 | 1/2008 | Basir et al. |
| 2008/0030376 A1 | 2/2008 | Tunnell et al. |
| 2008/0033809 A1 | 2/2008 | Black et al. |
| 2008/0039121 A1 | 2/2008 | Muller et al. |
| 2008/0048856 A1 | 2/2008 | Culpepper et al. |
| 2008/0076418 A1 | 3/2008 | Beyer, Jr. |
| 2008/0077595 A1 | 3/2008 | Leebow |
| 2008/0086741 A1 | 4/2008 | Feldman et al. |
| 2008/0097999 A1 | 4/2008 | Horan |
| 2008/0106599 A1 | 5/2008 | Liu et al. |
| 2008/0113674 A1 | 5/2008 | Baig |
| 2008/0118106 A1 | 5/2008 | Kilambi et al. |
| 2008/0126476 A1 | 5/2008 | Nicholas et al. |
| 2008/0132252 A1 | 6/2008 | Altman et al. |
| 2008/0134088 A1 | 6/2008 | Tse et al. |
| 2008/0140650 A1 | 6/2008 | Stackpole |
| 2008/0146157 A1 | 6/2008 | Aaron |
| 2008/0155080 A1 | 6/2008 | Marlow et al. |
| 2008/0177469 A1 | 7/2008 | Geelen et al. |
| 2008/0182563 A1 | 7/2008 | Wugofski et al. |
| 2008/0182591 A1 | 7/2008 | Krikorian |
| 2008/0183814 A1 | 7/2008 | Sanghavi |
| 2008/0188246 A1 | 8/2008 | Sheha et al. |
| 2008/0188261 A1 | 8/2008 | Arnone |
| 2008/0195428 A1 | 8/2008 | O'Sullivan |
| 2008/0201225 A1 | 8/2008 | Maharajh et al. |
| 2008/0208652 A1 | 8/2008 | Srivastava |
| 2008/0222295 A1 | 9/2008 | Robinson et al. |
| 2008/0227473 A1 | 9/2008 | Haney |
| 2008/0242271 A1 | 10/2008 | Schmidt et al. |
| 2008/0248815 A1 | 10/2008 | Busch |
| 2008/0249983 A1 | 10/2008 | Meisels et al. |
| 2008/0250312 A1 | 10/2008 | Curtis |
| 2008/0262717 A1 | 10/2008 | Ettinger |

(56) References Cited

U.S. PATENT DOCUMENTS

| | | |
|---|---|---|
| 2008/0280626 A1 | 11/2008 | Choi et al. |
| 2008/0280635 A1 | 11/2008 | Lei et al. |
| 2008/0288355 A1 | 11/2008 | Rosen |
| 2008/0288375 A1 | 11/2008 | Uhrig et al. |
| 2008/0294556 A1 | 11/2008 | Anderson |
| 2008/0306826 A1 | 12/2008 | Kramer et al. |
| 2008/0318597 A1 | 12/2008 | Berns et al. |
| 2008/0319808 A1 | 12/2008 | Wofford et al. |
| 2009/0005965 A1 | 1/2009 | Forstall et al. |
| 2009/0005968 A1 | 1/2009 | Vengroff et al. |
| 2009/0005987 A1 | 1/2009 | Vengroff et al. |
| 2009/0012955 A1 | 1/2009 | Chu et al. |
| 2009/0023410 A1 | 1/2009 | Ghosh |
| 2009/0024315 A1 | 1/2009 | Scheibe |
| 2009/0030778 A1 | 1/2009 | Zapata et al. |
| 2009/0030999 A1 | 1/2009 | Gatzke et al. |
| 2009/0047972 A1 | 2/2009 | Neeraj |
| 2009/0055229 A1 | 2/2009 | Lidgren et al. |
| 2009/0063205 A1 | 3/2009 | Shibasaki |
| 2009/0076894 A1 | 3/2009 | Bates et al. |
| 2009/0082038 A1 | 3/2009 | McKiou et al. |
| 2009/0085724 A1 | 4/2009 | Naressi et al. |
| 2009/0094527 A1 | 4/2009 | Parupudi et al. |
| 2009/0103722 A1 | 4/2009 | Anderson et al. |
| 2009/0104920 A1 | 4/2009 | Moon et al. |
| 2009/0106314 A1 | 4/2009 | Song et al. |
| 2009/0110177 A1 | 4/2009 | Sivakumar |
| 2009/0111438 A1 | 4/2009 | Chan |
| 2009/0112467 A1 | 4/2009 | Jiang et al. |
| 2009/0115570 A1 | 5/2009 | Cusack, Jr. |
| 2009/0115617 A1 | 5/2009 | Sano et al. |
| 2009/0125230 A1 | 5/2009 | Sullivan |
| 2009/0132365 A1 | 5/2009 | Gruenhagen et al. |
| 2009/0132652 A1 | 5/2009 | Athale et al. |
| 2009/0138346 A1 | 5/2009 | Kalaboukis et al. |
| 2009/0143984 A1 | 6/2009 | Baudisch et al. |
| 2009/0144211 A1 | 6/2009 | O'Sullivan et al. |
| 2009/0150501 A1 | 6/2009 | Davis et al. |
| 2009/0156160 A1 | 6/2009 | Evans et al. |
| 2009/0157312 A1 | 6/2009 | Black et al. |
| 2009/0157693 A1 | 6/2009 | Palahnuk |
| 2009/0164431 A1 | 6/2009 | Zivkovic et al. |
| 2009/0164459 A1 | 6/2009 | Jennings et al. |
| 2009/0164503 A1 | 6/2009 | Jung et al. |
| 2009/0164574 A1 | 6/2009 | Hoffman |
| 2009/0164919 A1 | 6/2009 | Bates et al. |
| 2009/0182492 A1 | 7/2009 | Alten |
| 2009/0201896 A1 | 8/2009 | Davis et al. |
| 2009/0210480 A1 | 8/2009 | Sivasubramaniam et al. |
| 2009/0222388 A1 | 9/2009 | Hua et al. |
| 2009/0224970 A1 | 9/2009 | Tsau |
| 2009/0234711 A1 | 9/2009 | Ramer et al. |
| 2009/0239552 A1 | 9/2009 | Churchill et al. |
| 2009/0286550 A1 | 11/2009 | Weinroth |
| 2009/0287783 A1 | 11/2009 | Beare et al. |
| 2009/0312033 A1 | 12/2009 | Shen et al. |
| 2009/0315670 A1 | 12/2009 | Naressi et al. |
| 2009/0319178 A1 | 12/2009 | Khosravy et al. |
| 2010/0004857 A1 | 1/2010 | Pereira et al. |
| 2010/0004997 A1 | 1/2010 | Mehta et al. |
| 2010/0020776 A1 | 1/2010 | Youssef et al. |
| 2010/0027527 A1 | 2/2010 | Higgins et al. |
| 2010/0030459 A1 | 2/2010 | Geelen et al. |
| 2010/0030578 A1 | 2/2010 | Siddique et al. |
| 2010/0030740 A1 | 2/2010 | Higgins et al. |
| 2010/0042364 A1 | 2/2010 | Nakamura et al. |
| 2010/0042511 A1 | 2/2010 | Sundaresan et al. |
| 2010/0064007 A1 | 3/2010 | Randall |
| 2010/0069035 A1* | 3/2010 | Johnson ............... H04W 4/02 455/404.1 |
| 2010/0082301 A1 | 4/2010 | Skibiski et al. |
| 2010/0088148 A1* | 4/2010 | Presswala ............. G06Q 30/02 705/7.29 |
| 2010/0103277 A1 | 4/2010 | Leebow |
| 2010/0130226 A1 | 5/2010 | Arrasvuori et al. |
| 2010/0130233 A1 | 5/2010 | Parker |
| 2010/0169131 A1 | 7/2010 | Robertson |
| 2010/0197318 A1 | 8/2010 | Petersen et al. |
| 2010/0197319 A1 | 8/2010 | Petersen et al. |
| 2010/0198814 A1 | 8/2010 | Petersen et al. |
| 2010/0198826 A1 | 8/2010 | Petersen et al. |
| 2010/0198862 A1 | 8/2010 | Jennings et al. |
| 2010/0198870 A1 | 8/2010 | Petersen et al. |
| 2010/0198917 A1 | 8/2010 | Petersen et al. |
| 2010/0203953 A1 | 8/2010 | Alderucci et al. |
| 2010/0217525 A1 | 8/2010 | King et al. |
| 2010/0250727 A1 | 9/2010 | King et al. |
| 2011/0136506 A1 | 6/2011 | Stewart |
| 2012/0003998 A1 | 1/2012 | McGary |
| 2012/0041672 A1* | 2/2012 | Curtis ................... H04H 20/57 701/426 |
| 2012/0041983 A1 | 2/2012 | Jennings |
| 2012/0042046 A1 | 2/2012 | Petersen et al. |
| 2012/0042258 A1 | 2/2012 | Etkin |
| 2012/0046860 A1 | 2/2012 | Curtis et al. |
| 2012/0047087 A1 | 2/2012 | Amidon et al. |
| 2012/0047102 A1 | 2/2012 | Petersen et al. |
| 2012/0052883 A1* | 3/2012 | Austin .................. G01S 5/0063 455/456.6 |
| 2012/0072495 A1 | 3/2012 | Jennings et al. |
| 2013/0035114 A1 | 2/2013 | Holden et al. |
| 2014/0087752 A1* | 3/2014 | Zhu ....................... H04W 24/00 455/456.1 |
| 2014/0201276 A1* | 7/2014 | Lymberopoulos ...... G06F 17/30 709/204 |
| 2015/0142822 A1* | 5/2015 | Xue ..................... G06F 17/3087 707/743 |

FOREIGN PATENT DOCUMENTS

| | | |
|---|---|---|
| EP | 1338966 | 8/2003 |
| EP | 1463354 | 12/2005 |
| JP | 09-287970 | 4/1997 |
| JP | 2003132158 | 5/2003 |
| JP | 2004045054 | 2/2004 |
| WO | WO 01/46781 | 6/2001 |
| WO | WO 03/081391 | 10/2003 |
| WO | WO 2007/103886 | 9/2007 |
| WO | WO 2008/000046 | 1/2008 |

OTHER PUBLICATIONS

Borah, B., et al., "A Clustering Technique Using Density Difference," IEEE—ICSCN 2007, MIT Campus, Anna University, Chennai, India, Feb. 22-24, 2007, pp. 585-588.

Vigueras, G. et al., "A comparative study of partitioning methods for crowd simulations," Applied Soft Computing, vol. 10, Issue 1, Jan. 2010, available online Jul. 22, 2009, pp. 225-235, 12 pages.

Bettini, C. et al., "A Distributed Architecture for Management and Retrieval of Extended Points of Interest," In Proceedings of the 25th IEEE International Conference on Distributed Computing Systems—Workshops (ICDCS 2005 Workshops), Jun. 6-10, 2005, Columbus, Ohio, IEEE Computer Society, 2005, pp. 266-272, 7 pages.

"About Google Map Maker," at <http://sites.google.com/site/mapmakeruserhelp/home>, printed May 21, 2009, 1 page.

"AirSage's WiSE Technology," at <http://www.airsage.com/site/index.cfm?id_art=46598&actMenuItemID=22134&vsprache/EN/AIRSAGE_WiSE_TECHNOLOGY_L.cfm>, viewed as early as Mar. 22, 2010, company founded in May 2000, 1 page.

Iannella, R., "An Idiot's Guide to the Resource Description Framework," The New Review of Information Networking, vol. 4, Sep. 3, 1998, pp. 1-10.

"Anthem—Overview," at <http://www.intercastingcorp.com/platform/anthem>, copyright 2004-2007, Intercasting Corp., printed Jan. 16, 2008, 2 pages.

"Apple—iPod classic," at <http://www.apple.com/ipodclassic/>, printed Oct. 26, 2007, 1 page.

Penrod, Sam, "Automobile Navigator," Magellan's Roadmate 360, Dec. 18, 2005, <http://www.gpsinformation.org/penrod/rm360/rm360.html>17 pages.

(56) References Cited

OTHER PUBLICATIONS

"Bluetooth.com—Learn," http://www.bluetooth.com/Bluetooth/Learn/, copyright 2007 Bluetooth SIG, Inc., printed Oct. 26, 2007, 1 page.

Oh, Sejin et al., "CAMAR: Context-aware Mobile Augmented Reality in Smart Space," In Proceedings of International Workshop on Ubiquitous Virtual Reality 2009, Bruce Thomas et al. (Eds.), Jan. 15-18, 2009, University of South Australia, Adelaide, Australia, pp. 48-51, 4 pages.

Dogru, Muzaffer, "Car Pooling With GIS Map Server and Web Services," Department of Information Technology, University of Zurich, Switzerland, Aug. 6, 2004, pp. 1-83.

"CitySense—Powered by Sense Networks," at <http://www.citysense.com/moreinfo.php>, copyright 2008, Sense Networks, printed Sep. 8, 2009, 2 pages.

"Club TomTom," at <http://www.clubtomtom.com/general/get-to-know-tomtom-mapshare%E2%84%A2/>, Jul. 31, 2007, copyright TomTom, printed Mar. 12, 2010, 9 pages.

"ConnectingCadence.com—Mapping the social world.," at <http://www.connectingcadence.com/>, found on the Internet Archive, copyright 2008, ConnectingCadence, printed Apr. 28, 2011, 1 page.

"Creating Custom Properties for Files and Folders," [online] May 1999 [retrieved on Mar. 4, 2007] Retrieved from the Internet: <URL: http://www.bc.edu/offices/help/meta-elements/doc/articles/html/MYF-customprops.shtml> 5 pages.

Wu et al., "Crowd Flow Segmentation Using a Novel Region Growing Scheme," In Proceedings PCM 2009, 10th Pacific Rim Conference on Multimedia, Bangkok, Thailand, Dec. 15-18, 2009, pp. 898-907, 10 pages.

Benford, S. et al., "Crowded Collaborative Virtual Environments," Proceedings of the SIGCHI Conference on Human Factors in Computing Systems, Atlanta, Georgia, Mar. 22-27, 1997, 7 pages.

Zahradnik, Fred, "Dash Express is Innovative, but There's Room for Improvement," at <http://gps.about.com/od/incarportablegp1/fr/dash_review.htm>, from the Internet Archive, dated Nov. 8, 2009, printed Apr. 20, 2012, 3 pages.

Jain, A. K., "Data Clustering: 50 Years Beyond K-Means," 19th International Conference on Pattern Recognition (ICPR), Tampa, FL, Dec. 8, 2008, 33 pages.

Anciaux, N. et al., "Data Degradation: Making Private Data Less Sensitive Over Time," CIKM 2008, Oct. 26-30, 2008, Napa Valley, California, 2 pages.

"Dating Service—Singles, Personals and Love, Match.com," http://www.match.com/, copyright 2008 Match.com, printed Jan. 16, 2008, 2 pages.

Agostini, A. et al., "Demo: Ontology-based Context-aware Delivery of Extended Points of Interest," 6th International Conference on Mobile Data Management (MDM'05), Ayia Napa, Cyprus, May 9-13, 2005, copyright 2005, ACM, 2 pages.

Marshall, M., "Destination Known," The Mercury News [online] (Sep. 27, 2004) [retrieved on Aug. 2, 2005] Retrieved from the Internet: <URL: http://www.mercurynews.com/mid/mercury-news/business/9770733.htm?1c> 2 pages.

Millonig, A. and Schechtner, K., "Developing Landmark-based Pedestrian Navigation Systems," Proceedings of the 8th International IEEE Conference on Intelligent Transportation Systems, Vienna, Austria, Sep. 13-16, 2005, copyright 2005, IEEE, 6 pages.

Harney, John, Digital prospecting—social networks in sales, Jun. 1, 2004, KMWorld.com, available at <http://www.kmworld.com/Articles/ReadArticle.aspx?ArticleID=9558>, printed Dec. 21, 2011, 3 pages.

Davies, J. J. et al., "Distributed, vehicular computation for map generation," presentation slides, 2007 Annual Meeting of the Association of American Geographers, Apr. 2007, found at <http://www.cl.cam.ac.uk/research/dtg/www/files/publications/public/027/davies-aag07.pdf>, 21 pages. ♂.

"dodgeball.com :: mobile social software," at <http://www.dodgeball.com/>, copyright 2008, Google Inc., printed Jan. 16, 2008, 1 page.

Ngai, Wang Kay et al., "Efficient Clustering of Uncertain Data," Proceedings of the Sixth International Conference on Data Mining (ICDM'06), Dec. 18-22, 2006, pp. 436-445, copyright 2006, IEEE, 10 pages.

"eHarmony," http://eharmony.com/, copyright 2000-2008 eHarmony.com, printed Jan. 16, 2008, 1 page.

Abstract, Ekpenyong, F., Palmer-Brown, D., and Brimicombe, A., "Extracting road information from recorded GPS data using snap-drift neural network," Neurocomputing, vol. 73, Issues 1-3, Dec. 2009, pp. 24-36, 6 pages.

Ertoz, L. et al., "Finding Clusters of Different Sizes, Shapes, and Densities in Noisy, High Dimensional Data," Proceedings of the 2003 SIAM International Conference on Data Mining (SDM 2003), Jan. 24, 2003, pp. 47-58, San Francisco, CA, 12 pages.

"Fire Eagle," at <http://fireeagle.yahoo.net>, copyright 2007-2011, Yahoo! Inc., printed Apr. 28, 2011, 2 pages.

"Fire Eagle : What is Fire Eagle?", found at <http://fireeagle.yahoo.net/help> on the Internet Archive, dated Jul. 9, 2011, copyright 2007-2011, Yahoo! Inc., printed Nov. 10, 2011, 4 pages.

"Flickr," http://www.flickr.com/, copyright 2008 Yahoo! Inc., printed Jan. 16, 2008, 1 page.

"Flickr Shapefiles Public Dataset 1.0," posted by aaron on May 21, 2009, found at <http://code.flickr.com/blog/2009/05/21/flickr-shapefiles-public-dataset-10/>, Yahoo! Inc., printed Jul. 13, 2011, 5 pages.

"Friend of a Friend (FOAF) project," at <http://www.foaf-project.org/>, from the Internet Archive dated May 26, 2008, printed Aug. 10, 2012, 2 pages.

"Friendster—Home," http://www.friendster.com/, copyright 2002-2007 Friendster, Inc., printed Jan. 16, 2008, 1 page.

"Garmin: MapSource POI Sources," at <http://www8.garmin.com/products/poiloader/POISource/>, earliest date available for this webpage on Internet Archive is Oct. 24, 2005, copyright 1996-2012, Garmin Ltd., printed Apr. 3, 2012, 4 pages.

"Google AdWords: Regional and Local Targeting," https://adwords.google.com/select/targeting.html, copyright 2008 Google, printed Jul. 17, 2008, 1 page.

Shankland, Stephen, "Google crowdsources maps directions, too," Mar. 11, 2009, at <http://news.cnet.com/8301-17939_109-10193481-2.html>, printed May 21, 2009, 3 pages.

"Google Maps," at <http://maps.google.com>, printed May 3, 2011, 1 page.

"Google Talk," http://www.google.com/talk/, copyright 2008 Google, printed Jan. 16, 2008, 1 page.

"Goombah" Preview, at <http://www.goombah.com/preview.html>, printed Jan. 8, 2008, 5 pages.

"GPS Mapping Software" [online] Des Newman's OziExplorer [retrieved on Aug. 2, 2005] Retrieved from the Internet <URL: http://www.ozieplorer.com> 2 pages.

"GPS software for cell phones, update Nov. 2008," Nov. 2008, at <http://www.gps-practice-and-fun.com/gps-software-for-cell-phones-update.html>, copyright GPS-practice-and-fun.com, printed Apr. 22, 2009, 6 pages.

"Harnessing Dynamic Personal Social Network Applications," posted Jan. 13, 2009, peterpixel, at <http://www.peterpixel.nl/writings/harnessing-dynamic-personal-social-network-applications/>, printed Jun. 12, 2009, 4 pages.

Tan, Thai, "Honda GPS with Weather Info and Social Networking," Oct. 16, 2006, laptoplogic.com, at <http://laptoplogic.com/news/detail.php?id=1557>, copyright 2007-2009, LaptopLogic, printed Apr. 22, 2009, 3 pages.

Arrington, M., "I Saw the Future of Social Networking the Other Day," TechCrunch, Apr. 9, 2008, at <http://www.techcrunch.com/2008/04/09/i-saw-the-future-of-social-networking-the-other-day/>, printed May 27, 2009, 28 pages.

"iChat. Not being there is half the fun," http://www.apple.com/macosx/features/ichat.html, printed Jan. 16, 2008, 1 page.

"icq," http://www.icq.com/, copyright 1998-2008 ICQ Inc., printed Jan. 16, 2008, 2 pages.

(56) References Cited

OTHER PUBLICATIONS

Bruntrup, R. et al., "Incremental Map Generation with GPS Traces," Presentation Slides, University of Dortmund, Germany, 2005, found at <http://www.google.com/url?sa=t&rct=j&q=bruntrup%20incremental%20map%20generation&source=web&cd=2&ved=0CCoQFjAB&url=http%3A%2F%2Fmapgeneration.berlios.de%2Ftiki%2Ftiki-download_wiki_attachment.php%3FattId%3D1&ei=ZruVT_O8J9L16AGV-LGKBA&usg=AFQjCNF4B61uAHpAjtDc46FyNLqw4bgl1A>, 16 pages.

Bruntrup, R., et al., "Incremental Map Generation with GPS Traces," in Proc. of the IEEE Conference on Intelligent Transportation Systems, Sep. 13-16, 2005, Vienna, Austria, pp. 574-579, copyright 2005, IEEE, 7 pages.

"Instant Messenger—AIM—Instant Message Your Online Buddies for Free—AIM," http://dashboard.aim.com/aim, copyright 2007 AOL LLC, printed Nov. 8, 2007, 6 pages.

"Intel and ARM collaborate on device security," Oct. 15, 2007, at <http://www.windowsfordevices.com/news/NS5120676853.html>, copyright 1996-2010, Ziff Davis Enterprise Holdings, Inc., printed Apr. 20, 2012, 5 pages.

"Internet Relay Chat—Wikipedia, the free encyclopedia," http://en.wikipedia.org/wiki/IRC, printed Nov. 16, 2007, 11 pages.

"IP Multimedia Subsystem," http://en.wikipedia.org/wiki/IP_Multimedia_Subsystem, printed Jul. 8, 2009, 11 pages.

Estrin, M., "Is the MySpace crowd lying to marketers?", Oct. 16, 2007, posted at iMedia Connection, at <http://www.imediaconnection.com/content/16993.asp>, copyrighted by iMedia Communications, Inc., printed Apr. 28, 2011, 2 pages.

"Jabber SoftwareFoundation," http://www.jabber.org/, copyright 1999-2005 the Jabber Software Foundation, printed Jan. 16, 2008, 3 pages.

Acroterion, "Knowledge Base Social Network Applications," available at <http://www.acroterion.ca/Knowledge_Base_Social_Network_Applications.html>, copyright 2001-2005, printed Dec. 21, 2011, 2 pages.

Ardagna, C.A. et al., "Location Privacy Protection Through Obfuscation-based Techniques," Lecture Notes in Computer Science, 2007, vol. 4602, pp. 47-60, Data and Applications Security XXI, Jul. 8-11, 2007, Redondo Beach, California, 16 pages.

"About Loopt," at <http://about.loopt.com/>, printed May 3, 2011, 4 pages.

"Loopt—About Us," at <https://loopt.com/loopt/aboutUs.aspx>, from the Internet Archive, dated Jun. 29, 2007, copyright 2007, Loopt, Inc., 1 page.

Jones, M., "Matt's Wikimapia Blog," Sep. 15, 2006, at <http://wikimapia.mattjonesblog.com/2006/09/15/how-to-1-adding-a-new-place/>, printed May 21, 2009, 24 pages.

Microsoft Outlook 2000 SP-3, email example, printed Oct. 23, 2007, copyright 1995-1999, Microsoft Corp., 3 pages.

"MobiClique," publication date unknown (copyright 2007-2009), Thomson, originally found at <http://www.thlab.net/~apietila/mobiclique/>, printed Oct. 23, 2009, 5 pages.

Amin, Saurabh et al., "Mobile Century—Using GPS Mobile Phones as Traffic Sensors: A Field Experiment," 15th World Conference on Intelligent Transportation Systems, Nov. 16-20, 2008, New York, New York, available from <http://www.ce.berkeley.edu/~bayen/conferences/its08.pdf>, 4 pages.

"Mobile community, free sms, mobile dating, text flirting and friends networking—playtxt . . . ," http://web.archive.org/web/20070225125113rn_1/www.playtxt.net/playtxt.do, printed Jan. 16, 2008, 1 page.

Abstract, Ratti, C. et al., "Mobile Landscapes: using location data from cell phones for urban analysis," Environment and Planning B: Planning and Design, vol. 33, No. 5, 2006, pp. 727-748, 1 page.

Choney, Suzanne, "Mobile services mushroom for locating friends," Aug. 14, 2008, copyright 2008, MSNBC.com, 1 page.

"MySpace," at <http://www.myspace.com/>, copyright 2003-2008, MySpace.com, printed Jan. 16, 2008, 2 pages.

Priya Ganapati, "Navigation Companies Crowdsource Maps, Traffic Services," Feb. 11, 2009, at <http://www.wired.com/gadgetlab/2009/02/user-generated/>, printed May 21, 2009, 4 pages.

"NAVTEQ: The secrets behind Ovi Maps," at <http://noknok.tv/2009/07/08/navteq-the-secrets-behind-ovi-maps/>, Jul. 8, 2009, copyright 2007-2010, Republic Publishing Ltd, printed Mar. 12, 2010, 6 pages.

Privat, Ludovic, "NAVX: 'We provide Content to TomTom, Garmin and Mio,'" GPS Business News, Feb. 2, 2009, at <http://www.gpsbusinessnews.com/NAVX-we-provide-content-to-TomTom,-Garmin-and-Mio-_a1305.html>, printed Apr. 20, 2012, 2 pages.

"Neatcall—Products," found at <http://neatcall.com/index.php?dir=site&page=content&cs=3008> on Internet Archive, dated Mar. 1, 2010, copyright 2010, Neatcall Ltd., printed Oct. 26, 2011, 2 pages.

Ye, Y., et al., "Neighborhood Density Method for Selecting Initial Cluster Centers in K-Means Clustering," PAKDD 2006, pp. 189-198.

"Off Road Navigation" [online] Thales Navigation, Inc., 2005 [retrieved on Aug. 2, 2005] Retrieved from the Internet: <URL: http://www.magellangps.com/assets/manuals/newprod/manual_offroadnav.pdf> 21 pages.

"Online adult dating service and personals—Lavalife—Where Singles Click," at <http://lavalife.com/>, copyright 2006, Lavalife Corp., printed Jan. 16, 2008, 1 page.

Hardt, D. et al., "OpenID Attribute Exchange 1.0—Final," at <http://openid.net/specs/openid-attribute-exchange-1_0.html>, Dec. 5, 2007, 11 pages.

"OpenID Foundation website," at <http://openid.net>, copyright 2006-2011, OpenID Foundation, printed Apr. 28, 2011, 2 pages.

"OpenLDA Software 2.3 Administrator's Guide: Schema Specification," [online] Jun. 2003 [retrieved on Mar. 4, 2007] Retrieved from the Internet: <URL: http://www.openldap.org/doc/admin23/schema.html> pp. 2-8.

"OpenStreetMap," <http://www.openstreetmap.org/>, printed May 21, 2009, 1 page.

PAJ 2003-132158.

Quinn, M. et al., "Parallel Implementation of the Social Forces Model," Proceedings of the Second International Conference in Pedestrian and Evacuation Dynamics, Greenwich, England, 2003, pp. 63-74, found at <http://web.engr.oregonstate.edu/~metoyer/docs/parallelPeds.pdf>, 12 pages.

"Picasa," Wikipedia, at <http://en.wikipedia.org/wiki/Picasa>, from the Internet Archive, dated Feb. 5, 2009, last modified Feb. 4, 2009, printed May 17, 2012, 7 pages.

"Plazes—Right Plaze, Right Time," at <http://plazes.com>, copyright 2004-2011, Plazes AG, printed May 3, 2011, 2 pages.

Miller, B. N. et al., "PocketLens: Toward a Personal Recommender System," ACM Transactions on Information Systems, vol. 22, No. 3, Jul. 2004, pp. 437-476, 40 pages.

"Portable Contacts," at <http://portablecontacts.net>, from the Internet Archive dated Mar. 5, 2009, printed Mar. 27, 2012, 2 pages.

Cox, L.P. et al., "Presence-Exchanges: Toward Sustainable Presence-Sharing," In Proc. of 7th IEEE Workshop on Mobile Computing Systems and Applications, Apr. 6-7, 2006, Semiahmoo Resort, Washington, pp. 55â€"60, 6 pages.

"Rabble—Social networking for your phone," http://www.rabble.com/, copyright 2005-2008 Intercasting Corp., printed Jan. 16, 2008, 1 page.

"Reality Mining," at <http://reality.media.mit.edu/dyads.php>, copyright 2009, Nathan Eagle, Massachusetts Institute of Technology, with references back to 2000, 3 pages.

"Resource Description Framework (RDF) / W3C Semantic Web Activity," at <http://www.w3.org/RDF/>, from the Internet Archive dated Jul. 30, 2008, printed Aug. 10, 2012, 6 pages.

"RFID in Japan, Crossing the Chasm, RFID Gets Bendy," Card Korea & Ubiquitous Biz Show 2005 in Seoul [online] (Mar. 17, 2005), [retrieved on Aug. 2, 2005] Retrieved from the Internet: <URL: http://ubiks.net/local/blog/jmt/archives3/003524.html> 2 pages.

Davies, J. J. et al., "Scalable, Distributed, Real-Time Map Generation," Pervasive Computing, vol. 5, No. 4, Oct.-Dec. 2006, pp. 47-54, copyright 2006, IEEE, 9 pages.

(56) References Cited

OTHER PUBLICATIONS

Abstract, "Self-Organized Pedestrian Crowd Dynamics: Experiments, Simulations, and Design Solutions," by Helbing, D. et al., Transportation Science, vol. 39, Issue 1, Feb. 2005, obtained from ACM Digital Library at <http://portal.acm.org/citation.cfm?id=1247227>, printed Apr. 28, 2011, 2 pages.
"Sense Networks," at <http://www.sensenetworks.com/about_us.php>, copyright 2008-2010, Sense Networks, printed Apr. 28, 2011, 1 page.
"Sense Networks—Machine Learning," at <http://www.sensenetworks.com/machine_learning.php>, copyright 2008-2009, Sense Networks, printed Jan. 12, 2009, 2 pages.
"Sense Networks—Technology," at <http://www.sensenetworks.com/technology.php>, copyright 2008-2009, Sense Networks, printed Jan. 12, 2009, 2 pages.
"Sense Networks—The Minimum Volume Embedding Algorithm," at <http://www.sensenetworks.com/mve_algorithm.php>, copyright 2008-2009, Sense Networks, printed Jan. 12, 2009, 2 pages.
Abstract, "Sensor networks for social networks," by Farry, M.P., Thiesis, Dept. of Electrical Engineering and Computer Science, Massachusetts Institute of Technology, Feb. 2006, obtained from Dspace@MIT, at <http://dspace.mit.edu/handle/1721.1/36764>, printed Apr. 28, 2011, 3 pages.
"Six degrees of separation," at <http://en.wikipedia.org/wiki/Six_degrees_of_separation>, last modified on Apr. 19, 2011,printed Apr. 28, 2011, 11 pages.
"SmallPlanet: Home," http://web.archive.org/web/20061105030323/http://www.smallplanet.net/, copyright 2005 SmallPlanet.net, printed Jan. 16, 2008, 1 page.
Cox et al., "SmokeScreen: Flexible Privacy Controls for Presence-Sharing," Proceedings of the 5th International Conference on Mobile Systems, Applications, and Services (2007) (MobiSys '07), Jun. 11-13, 2007, San Juan, Puerto Rico, 13 pages.
"Social Serendipity," MIT Media Lab: Reality Mining, at <http://reality.media.mit.edu/serendipity.php>, available online as early as Apr. 2005, copyright 2009, Nathan Eagle / Massachusetts Institute of Technology, printed Jun. 12, 2009, 10 pages.
"Statistical inference," Wikipedia, at <http://en.wikipedia.org/wiki/Inferential_statistics>, from the Internet Archive, dated Feb. 3, 2009, last updated Aug. 25, 2008, printed Apr. 20, 2012, 3 pages.
"Technology—Geo Targeting," http://www.invidi.com/pages/itc_technology_05.html, copyright 2007, printed Nov. 18, 2008, 1 page.
"Tele Atlas Leverages Community Input to Add New Roads and Location Content," at <http://www.teleatlas.com/WhyTeleAtlas/Pressroom/PressReleases/TA_CT031226>, Jun. 22, 2009, Gent, Belgium, copyright 2010, Tele Atlas BV, printed Mar. 12, 2010, 2 pages.
"TomTom Map Share technology," at <http://www.tomtom.com/page/mapshare>, copyright 2009, TomTom International BV, printed Mar. 12, 2010, 3 pages.
Agostini, A. et al., "Towards Highly Adaptive Services for Mobile Computing," In Proceedings of IFIP TC8 Working Conference on Mobile Information Systems (MOBIS), Sep. 15-17, 2004, Oslo, Norway, Springer, 2004, pp. 121-134, 14 pages.
"TrackItBack—The World's Largest Lost & Found Recovery Service | News," articles dating from Mar. 29, 2005, to Jun. 27, 2008, found at <http://www.trackitback.com/portal/press.html>, copyright 2003-2011, TrackItBack, printed on Apr. 18, 2011, 4 pages.
Ekpenyong, F. et al., "Updating of Road Network Databases: Spatio-Temporal Trajectory Grouping Using Snap-Drift Neural Network," In Proceedings of International Conference on Engineering Applications of Neural Networks, EANN 2007, Aug. 29-31, 2007, Thessaloniki, Greece, 10 pages.
Jones, Q. et al., "Urban Enclave Location-Aware Social Computing," Proceeds of Internet Research 7.0: Internet Convergences, Brisbane, Australia, Sep. 27-30, 2006, found at <http://aoir.org/files/c4d0c2e397e8a5ddb140a40f7fa9.pdf>, 10 pages.
Hofte, Henri ter, "Using groups and social networks in mobile applications," Freeband Ambient Communication Event, Jul. 4, 2006, Enschede, The Netherlands, 41 pages.
"Welcome to Facebook!—Facebook," at <http://www.facebook.com/>, copyright 2008, Facebook, printed Jan. 9, 2008, 1 page.
"Welcome to LuckyCal," at <http://www.luckycal.com>, copyright 2007-2010, LuckyCal, printed Apr. 20, 2012, 1 page.
"What is LinkedIn?," at <http://www.linkedin.com/static?key=what_is_linkedin&trk=hb_what>, copyright 2011, LinkedIn Corporation, printed Apr. 28, 2011, 1 page.
"WikiMapia," Wikipedia, at <http://en.wikipedia.org/wiki/WikiMapia>, last modified May 19, 2009, printed May 21, 2009, 4 pages.
"Windows Live Messenger—Overview," http://get.live.com/messenger/overview, copyright 2007 Microsoft Corp., printed Nov. 28, 2007, 1 page.
"Yahoo! Personals," http://personals.yahoo.com/us/homepage/splash, copyright 2008 Yahoo! Inc., printed Jan. 16, 2008, 2 pages.
Clarke, Roger and Wigan, Marcus, "You are where you have been," Third Workshop on the Social Implications of National Security, Australia and the New Technologies: Evidence Based Policy in Public Administration, Jul. 23-24, 2008, Canberra, Australia, article 13, pp. 155-172, Eds. Michael, K. and Michael, M.G., copyright 2008, University of Wollongong and authors, 28 pages. ♂.
"Zune," http://www.zune.net/en-US/, copyright 2008 Microsoft Corporation, printed Jan. 16, 2008, 1 page.

\* cited by examiner

PASSIVE CROWD-SOURCED MAP UPDATES AND ALTERNATE ROUTE RECOMMENDATIONS

RELATED APPLICATIONS

This application is a continuation of U.S. Pat. No. 9,140,566, titled "Passive Crowd-Sourced Map Updates and Alternate Route Recommendations," filed on Dec. 20, 2013, which is a continuation of U.S. Pat. No. 8,620,532, titled "Passive Crowd-Sourced Map Updates and Alternate Route Recommendations," filed on Mar. 25, 2010, which claims the benefit of provisional patent application Ser. No. 61/163,091, filed Mar. 25, 2009, the disclosure of each of which is hereby incorporated herein by reference in its entirety.

FIELD OF THE DISCLOSURE

The present disclosure relates to crowd-sourced map updates and crowd-sourced alternate route recommendations.

BACKGROUND

Personal Navigation Devices (PNDs) often have maps that are out-of-date. Traditional mechanisms for updating the maps of PNDs are cumbersome and inconvenient. More specifically, traditionally companies such as NAVTEQ collect information regarding roads by driving every road using specially equipped cars. These companies then provide the collected information to PND providers for use in their maps. Recently, TomTom has introduced a service referred to as Map Share that enables users of TomTom® PNDs to manually make corrections to their maps and then share their corrections with other users of the TomTom® Map Share service. However, even though the TomTom® Map Share service provides some advantages, it is still cumbersome and burdensome on the users in that they must manually make corrections to their maps. As such, there is a need for a system and method for updating the maps of PNDs that places little, if any, burden on users of the PNDs. In addition, an improved system and method for providing alternate route recommendations to users is needed.

SUMMARY

Systems and methods for providing passive crowd-sourced alternate route recommendations are disclosed. In one embodiment, locations of users of a number of mobile location-aware devices are tracked over time. Upon receiving a request for alternate routes from a requestor, users of mobile location-aware devices that have traveled from or through a start location identified by the request to or through a stop location identified by the request are identified. Location histories for the identified users are analyzed to determine one or more routes taken by the users from the start location to the stop location. The one or more routes, or a select subset of the one or more routes, are then returned to the requestor as recommended alternate routes. In addition, one or more characteristics of the recommended alternate routes may be determined and returned to the requestor. For each recommended alternate route, the one or more characteristics may include, for example, an average travel time for the recommended alternate route, an average travel time for the recommended alternate route for a desired time window, a number of users that have previously traveled the recommended alternate route, or the like.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
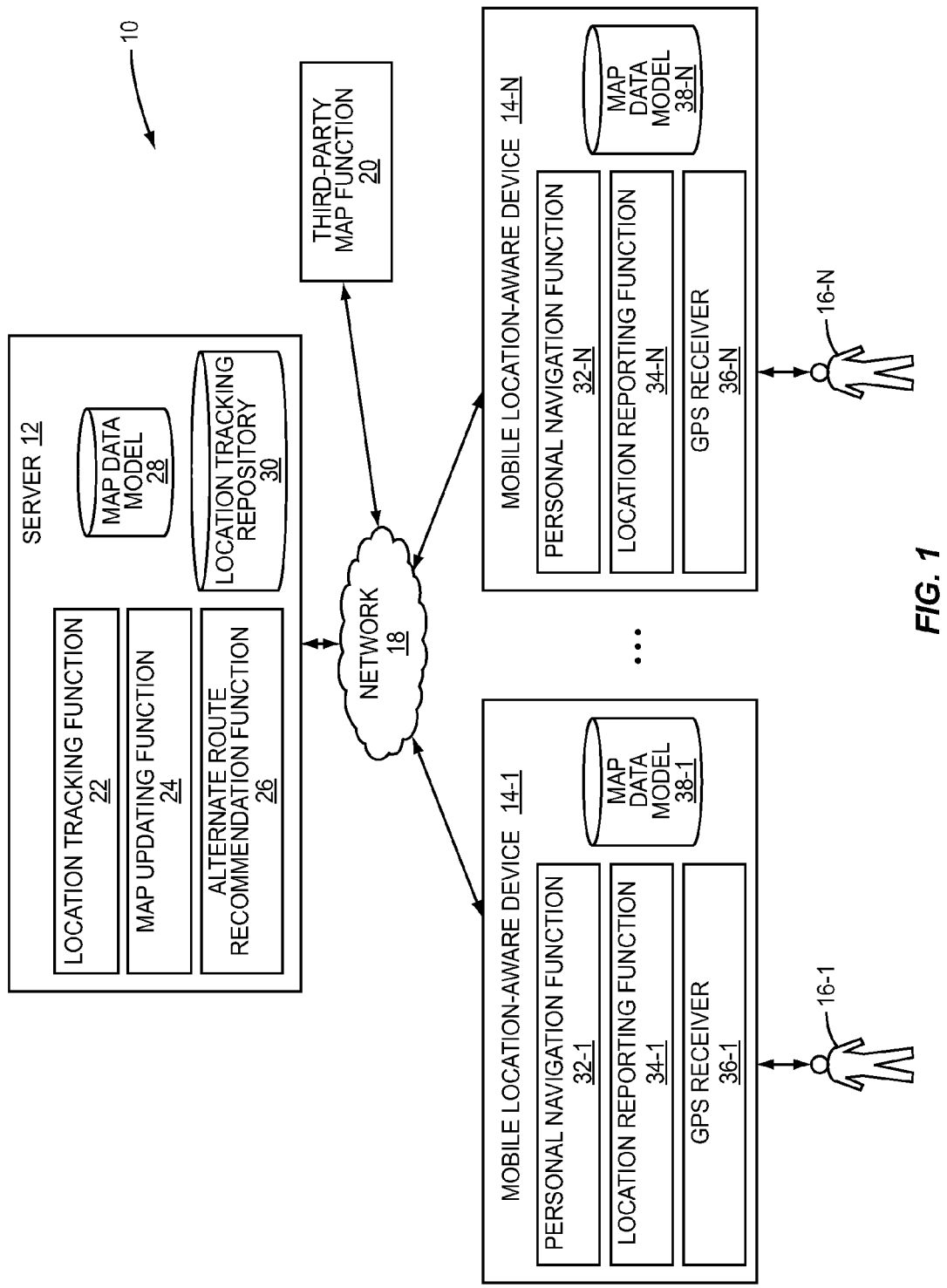
FIG. 1 illustrates a system for providing crowd-sourced map updates and crowd-sourced alternate route recommendations according to one embodiment of the present disclosure.

FIG. 1 illustrates a system 10 for providing passive crowd-sourced map updates, passive crowd-sourced alternate route recommendations, or both according to one embodiment of the present disclosure. As illustrated, the system 10 includes a server 12 and a number of mobile location-aware devices 14-1 through 14-N having associated users 16-1 through 16-N. The server 12 and the mobile location-aware devices 14-1 through 14-N are connected via a network 18. The network 18 is preferably a publicly accessible distributed network such as the Internet. In addition, in this embodiment, the system 10 may also include a third-party map function 20.

The server 12 is a physical server. Note, however, that while only a single server 12 is illustrated for clarity and ease of discussion, the system 10 may include multiple servers 12 that operate in a collaborative manner for purposes of load-sharing and/or redundancy. The server 12 includes a location tracking function 22, a map updating function 24, and an alternate route recommendation function 26, each of which is preferably implemented in software but is not limited thereto. In addition, the server 12 includes a map data model 28 and a location tracking repository 30. The location tracking function 22 generally operates to receive location updates from the mobile location-aware devices 14-1 through 14-N defining locations of the users 16-1 through 16-N over time and to store corresponding data in the location tracking repository 30. Note that while the description herein refers to the tracking of the locations of the users 16-1 through 16-N, as used herein, the locations of the users 16-1 through 16-N is synonymous with the locations of the mobile location-aware devices 14-1 through 14-N. The data stored in the location tracking repository 30 may include a location history for each of the users 16-1 through 16-N or anonymized location histories that anonymously record the locations of the users 16-1 through 16-N. Using the user 16-1 of the mobile location-aware device 14-1 as an example, for each location update received from the mobile location-aware device 14-1 for the user 16-1, the location history for the user 16-1 includes the data from the location update (i.e., location and, optionally, a time-stamp, direction of travel, and/or speed of travel). Alternatively, the location history for the user 16-1 may include a number of vectors in the form of <start, stop, time-stamp, direction, speed> derived from the location updates received from the mobile location-aware device 14-1 for the user 16-1.

In another embodiment, anonymized location histories are stored in the location tracking repository 30. More specifically, again using the user 16-1 of the mobile location-aware device 14-1 as an example, the location history of the user 16-1 may be periodically persisted in the location tracking repository 30 as an anonymous location history. The anonymous location history is preferably a location history record or data object that has a new or unique identifier that is not tied back to the user 16-1 or the mobile location-aware device 14-1. For example, at a desired periodic time interval (e.g., hourly, daily, weekly, or the like), the location history of the user 16-1 may be persisted as an anonymous location history that is not tied back to the user 16-1. At the end of each periodic time interval, the location history of the user 16-1 is persisted as a new anonymous location history. Further, each time the location history of the user 16-1 is persisted as an anonymous location history, all of the location data (i.e., previous locations and, if any, time-stamps, directions of travel, and/or speed of travel) may be removed from the location history of the user 16-1.

The map updating function 24 generally operates to analyze the data in the location tracking repository 30 that reflects the locations of the users 16-1 through 16-N of the mobile location-aware devices 14-1 through 14-N over time in order to detect patterns that are indicative of updates that should be made to a map defined by the map data model 28. The map data model 28 is generally data that defines a map of a geographic area (e.g., North America, the United States of America, North Carolina, or the like). For instance, the map data model 28 may be Geographic Information Systems (GIS) data that defines a map for a geographic area. As discussed below in detail, in the preferred embodiment, the map updating function 24 operates to detect patterns of movement of the users 16-1 through 16-N of the mobile location-aware devices 14-1 through 14-N that are indicative of new roads that should be added to the map defined by the map data model 28. However, in a similar manner, the map updating function 24 may additionally or alternatively detect other changes that should be made to the map such as, for example, temporary or permanent road closures. For instance, the absence of movement of the users 16-1 through 16-N of the mobile location-aware devices 14-1 through 14-N over a particular road in the map for at least a threshold amount of time may be used as a detection that the road is closed.

The alternate route recommendation function 26 generally operates to recommend alternate routes to the users 16-1 through 16-N of the mobile location-aware devices 14-1 and 14-N and the third-party map function 20 based on the data in the location tracking repository 30. More specifically, as discussed below, the alternate route recommendation function 26 receives a request for alternate routes from a requestor, where the requestor may be one of the mobile location-aware devices 14-1 through 14-N or the third-party map function 20. The request identifies a desired start location and a desired stop location. The alternate route recommendation function 26 then uses the data in the location tracking repository 30 to identify a number of different routes previously taken by the users 16-1 through 16-N of the mobile location-aware devices 14-1 through 14-N from the desired start location to the desired stop location. One or more of the identified routes are then returned to the requestor as recommended alternate routes.

The mobile location-aware devices 14-1 through 14-N are generally any type of user devices that are enabled to determine the locations of the users 16-1 through 16-N and provide location updates for the users 16-1 through 16-N to the server 12 via the network 18. For example, each of the mobile location-aware devices 14-1 through 14-N may be a personal navigation device permanently installed in an automobile, a portable personal navigation device similar to those manufactured and sold by Garmin or TomTom, a mobile smart phone providing personal navigation device functionality such as an Apple® iPhone having a software application providing personal navigation device functionality, or the like. As illustrated, the mobile location-aware devices 14-1 through 14-N include personal navigation functions 32-1 through 32-N, location reporting functions 34-1 through 34-N, and Global Positioning System (GPS) receivers 36-1 through 36-N. In addition, in this embodiment, the mobile location-aware devices 14-1 through 14-N include map data models 38-1 through 38-N. Each of the map data models 38-1 through 38-N is a copy of the map data model 28 of the server 12 or a subset of the map data model 28 defining a portion of the map for a relevant geographic area. However, the present disclosure is not limited thereto. In an alternative embodiment, the mobile location-aware devices 14-1 through 14-N obtain map data from the server 12 as needed.

Using the mobile location-aware device 14-1 as an example, the personal navigation function 32-1 may be implemented in software, hardware, or a combination thereof. The personal navigation function 32-1 generally operates in a manner similar to a traditional personal navigation device. More specifically, the personal navigation function 32-1 provides turn-by-turn directions to the user 16-1 in order to navigate the user 16-1 from a desired start location to a desired stop location. The personal navigation function 32-1 may also provide additional features such as Point-of-Interest (POI) lookup, current traffic conditions, or the like. The location reporting function 34-1 generally operates to provide location updates for the user 16-1 to the server 12.

The third-party map function 20 may be implemented in hardware, software, or a combination thereof. For example, the third-party map function 20 may be a software application hosted by a physical server or farm of physical servers, a user device such as a personal computer, or the like. In general, the third-party map function 20 provides map-based services to users or entities. For example, the third-party map function 20 may be a web-based map service such as, or similar to, the Google® Maps service, the Bing® Maps service, the MapQuest® service, or the like. The third-party map function 20 may interact with the server 12 to obtain map updates and/or alternate routes.

Figure 2:
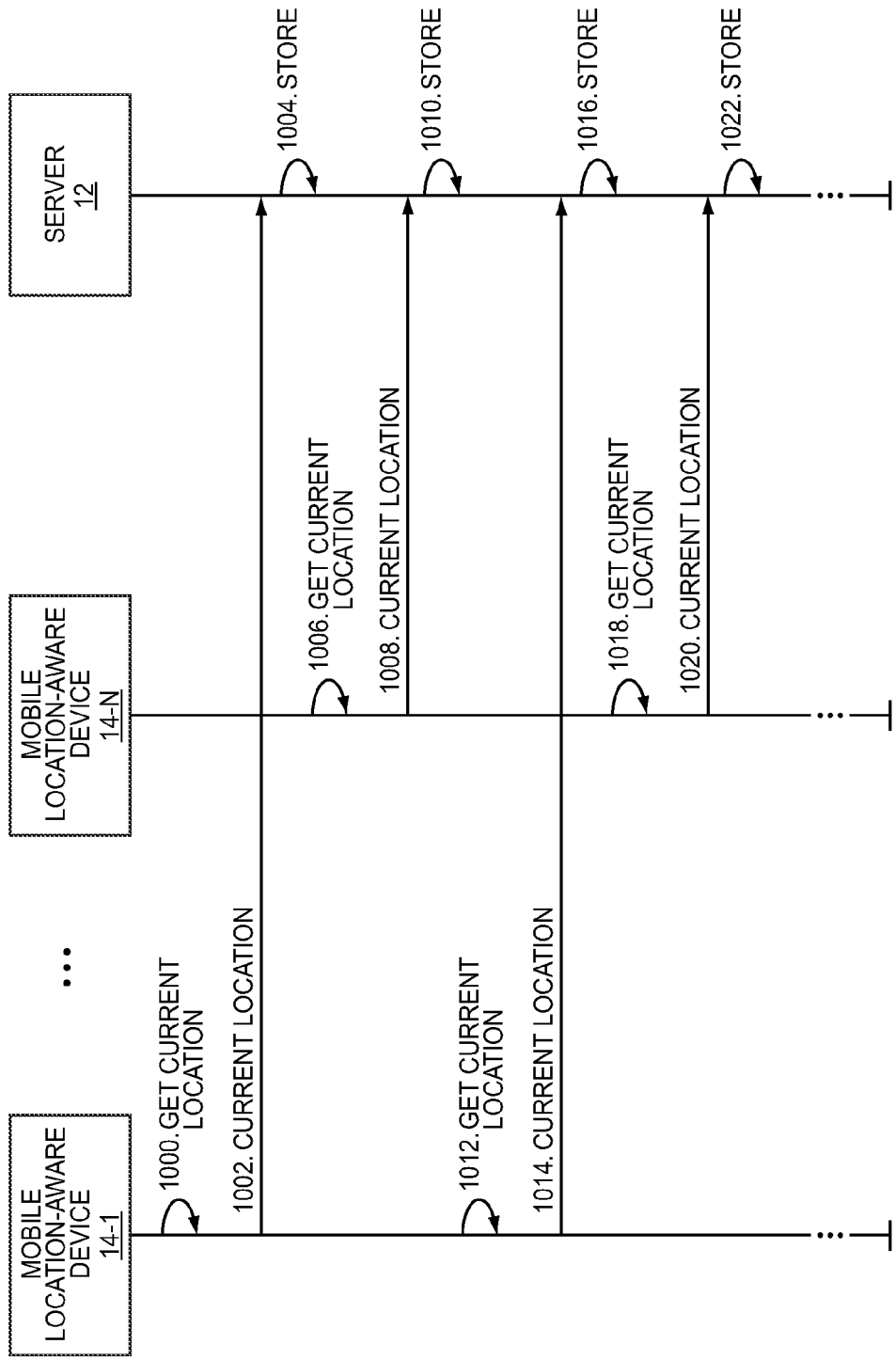
FIG. 2 illustrates the operation of the system of FIG. 1 to track the locations of users of the mobile location-aware devices according to one embodiment of the present disclosure.

FIG. 2 illustrates the operation of the system 10 of FIG. 1 to track the locations of the users 16-1 through 16-N according to one embodiment of the present disclosure. In this embodiment, tracking is performed passively by obtaining location updates for the users 16-1 through 16-N and storing corresponding data at the server 12. While this discussion uses the mobile location-aware device 14-1 and the user 16-1 as an example, this discussion is equally applicable to the other mobile location-aware devices 14-2 through 14-N and the other users 16-2 through 16-N. As illustrated, the mobile location-aware device 14-1, and more specifically the location reporting function 34-1, first gets a current location of the mobile location-aware device 14-1 (step 1000). In addition to the current location, the location reporting function 34-1 may get a time-stamp that defines the current time, a direction of travel of the mobile location-aware device 14-1, and/or a speed of travel of the mobile location-aware device 14. In the preferred embodiment, the location reporting function 34-1 gets the current location and, optionally, the current time, the direction of travel, and/or the speed of travel from the GPS receiver 36-1. However, the GPS receiver 36-1 is exemplary. Any suitable technology for determining or otherwise obtaining the current location of the mobile location-aware device 14-1 may be used. Next, the location reporting function 34-1 of the mobile location-aware device 14-1 sends a location update to the server 12 (step 1002). The location update includes the current location of the user 16-1, which is the current location of the mobile location-aware device 14-1 obtained from the GPS receiver 36-1. In addition, the location update may obtain a time-stamp defining the time at which the current location was obtained (i.e., the current time), the direction of travel of the mobile location-aware device 14-1 as the direction of travel of the user 16-1, and/or the speed of travel of the mobile location-aware device 14-1 as the speed of travel of the user 16-1.

Upon receiving the location update, the location tracking function 22 stores data in the location tracking repository 30 corresponding to the location update (step 1004). In one embodiment, the location tracking repository 30 includes a location history for each of the users 16-1 through 16-N. As such, in this embodiment, the location update, or more specifically the data included in the location update, is stored in a location history of the user 16-1 maintained in the location tracking repository 30. Alternatively, the location update may be processed to provide a vector from the last location of the user 16-1 to the current location of the user 16-1, where the vector may be <start location, stop location, time-stamp, direction, speed>. In another embodiment, as discussed above, the location tracking function 22 stores anonymized location histories. More specifically, the location tracking function 22 stores location histories for each of the users 16-1 through 16-N. However, periodically (e.g., hourly, daily, weekly, or the like), the location tracking function 22 persists the location histories of the users 16-1 through 16-N as anonymous location histories that are not tied back to the users 16-1 through 16-N and removes the location data (i.e., the previous locations and/or corresponding time-stamps, speeds of travel, and/or directions of travel, or previous vectors) from the location histories of the users 16-1 through 16-N. Anonymization may be performed as a background process. Alternatively, anonymization may be triggered by receipt of location updates. Thus, upon receiving the location update from the mobile location-aware device 14-1, the location tracking function 22 may store the location update in the location history of the user 16-1 and then determine if it is time to anonymize the location history of the user 16-1. If so, the location tracking function 22 removes the location updates from the location history of the user 16-1 and stores the location updates as an anonymous location history that is not tied back to the user 16-1 or the mobile location-aware device 14-1. Note that the most recent location update, most recent vector, or current location of the user 16-1 may be retained in the location history of the user 16-1 after anonymization is performed.

In the same manner, the other mobile location-aware devices 14-2 through 14-N get their current locations and send corresponding location updates to the server 12 (steps 1006 and 1008). In response, the location tracking function 22 stores corresponding data in the location tracking repository 30 for the users 16-2 through 16-N (step 1010). As illustrated, this process continues such that the mobile location-aware devices 14-1 through 14-N continue to send location updates for the users 16-1 through 16-N to the server 12 over time and corresponding data is stored in the location tracking repository 30 (steps 1012 through 1022).

Figure 3:
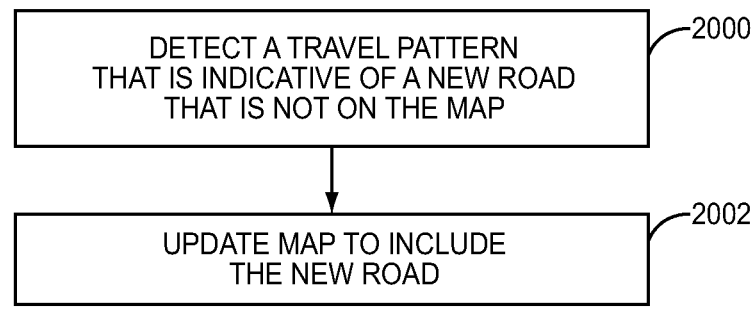
FIG. 3 is a flow chart illustrating a process for providing crowd-sourced map updates according to one embodiment of the present disclosure.

FIG. 3 illustrates the operation of the map updating function 24 of the server 12 according to one embodiment of the present disclosure. First, the map updating function 24 detects a travel pattern that is indicative of a new road that is not included on the map defined by the map data model 28 (step 2000). More specifically, the map updating function 24 analyzes the data in the location tracking repository 30 as compared to the map data model 28 to detect a pattern of movement of the users 16-1 through 16-N that is indicative of a new road that is not included on the map defined by the map data model 28. In general, a pattern indicative of a new road is a pattern of consistent and frequent travel of the users 16-1 through 16-N, or more specifically at least a subset of the users 16-1 through 16-N, in a manner that is consistent with travel along a road. In addition, the map updating function 24 may compute a degree of confidence for the new road. The degree of confidence is preferably a function of frequency of use and how recently the new road has been used.

Once the new road is detected, the map updating function 24 updates the map to include the new road (step 2002). More specifically, the map updating function 24 adds data defining the new road to the map data model 28. In addition, the map updating function 24 may add the degree of confidence for the new road to the map data model 28. At this point, in one embodiment, the map updating function 24 sends an update to the map data model 28 for the new road and the degree of confidence for the new road, if any, to one or more of the mobile location-aware devices 14-1 through 14-N. Those mobile location-aware devices 14-1 through 14-N that receive the update then add the update to their map data models 38-1 through 38-N. In addition, the map updating function 24 may send the update for the map data model 28 to the third-party map function 20. In an alternative embodiment, rather than immediately updating the map data model 28, the map updating function 24 may flag the update or otherwise send an alert regarding the update to an owner or editor of the map represented by the map data model 28 for verification before the map is officially updated.

Figure 4:
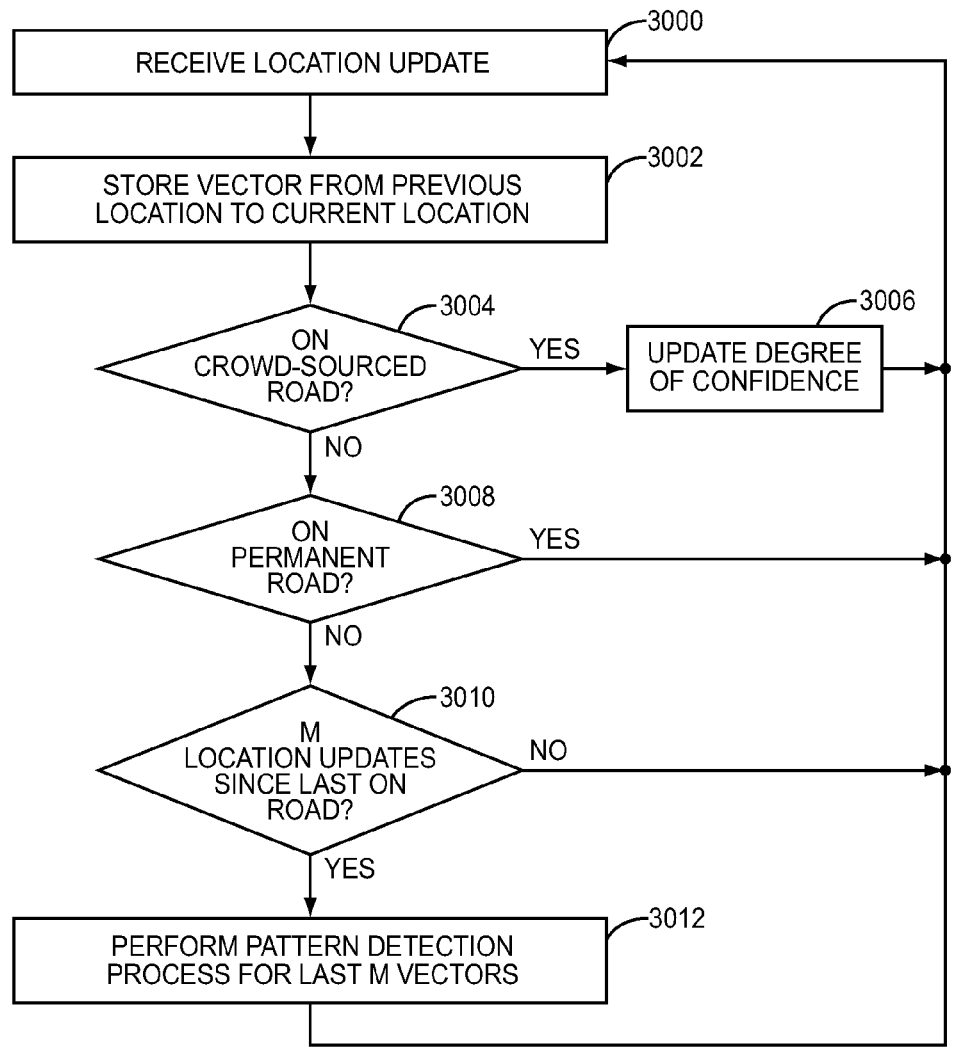
FIG. 4 is a more detailed flow chart illustrating a process for providing crowd-sourced map updates according to one embodiment of the present disclosure.

FIG. 4 is a more detailed flow chart illustrating the operation of the server 12 to update the map according to one embodiment of the present disclosure. In this embodiment, the location tracking function 22 receives a location update (step 3000). For this discussion, the location update is received from the mobile location-aware device 14-1 for the user 16-1. In response, the location tracking function 22 generates and stores a vector from a previous location of the user 16-1 to a current location of the user 16-1 identified in the location update (step 3002). The previous location of the user 16-1 is the location of the user 16-1 identified in the immediately preceding location update received from the mobile location-aware device 14-1. Again, the vector is preferably in the form of <start location, stop location, time-stamp, direction, speed> but is not limited thereto. "Start location" is the previous location of the user 16-1 identified by the immediately preceding location update for the user 16-1, "stop location" is the current location of the user 16-1 identified in the location update, time-stamp is the timestamp from the corresponding location update, direction is the direction of travel from the location update, and speed is the speed of travel from the location update.

Next, the map updating function 24 determines whether the user 16-1 is currently on a crowd-sourced road (step 3004). As used herein, a crowd-sourced road is a road previously added to the map by the map updating function 24 based on detected patterns of travel, or movement, of the users 16-1 through 16-N. Note, however, that a crowd-sourced road may be promoted to a permanent road in the map data model 28 when, for example, the crowd-sourced road is verified by an operator of the server 12 (i.e., a person) or the degree of confidence of the crowd-sourced road reaches a predefined threshold (e.g., 90% or 100%). The map updating function 24 determines whether the user 16-1 is currently on a crowd-sourced road by comparing the current location of the user 16-1 to the map data model 28. If the user 16-1 is on a crowd-sourced road, the map updating function 24 updates the degree of confidence of the crowd-sourced road (step 3006). Again, the degree of confidence is preferably a function of frequency of use of the crowd-sourced road and how recently the crowd-sourced road has been used. The more frequently and recently the crowd-sourced road has been used by the users 16-1 through 16-N, the higher the degree of confidence for the crowd-sourced road. At this point, the process returns to step 3000 and is repeated for the next received location update.

If the user 16-1 is not on a crowd-sourced road, the map updating function 24 determines whether the user 16-1 is currently on a permanent road (step 3008). As used herein, a permanent road is a road that was originally in the map or a crowd-sourced road added by the map updating function 24 that has been verified or that has a degree of confidence equal to or greater than a predefined threshold degree of confidence. If the user 16-1 is currently on a permanent road, the process returns to step 3000 and is repeated for the next received location update. If the user 16-1 is neither on a crowd-sourced road nor a permanent road, the map updating function 24 determines whether a predefined number (M) of location updates have been received for the user 16-1 since the user 16-1 was last determined to be on a road (i.e., a permanent road or a crowd-sourced road) (step 3010). The number M may be any integer greater than or equal to one (1). If less than M location updates have been received for the user 16-1 since the user 16-1 was last on a road, the process returns to step 3000 and is repeated for the next received location update.

If M location updates have been received for the user 16-1 since the user 16-1 was last on a road, the map updating function 24 performs a pattern detection process for the last M vectors in the location history of the user 16-1 (step 3012). Note that if vectors are not used, the pattern detection process is performed for the last M entries in the location history of the user 16-1. In general, the map updating function 24 obtains the last M vectors from the location history of the user 16-1. In addition, the map updating function 24 obtains other vectors from the location histories stored in the location tracking repository 30 that have start and stop locations in the same vicinity as the start and stop locations of one or more of the last M vectors for the user 16-1. These vectors are then analyzed to determine whether there is a pattern of travel or movement that is indicative of a new road. If so, the map updating function 24 updates the map data model 28 with data defining the new road. In addition, map updates may be sent to one or more of the mobile location-aware devices 14-1 through 14-N and/or the third-party map function 20. At this point, the process returns to step 3000 and is repeated for the next received location update.

Figure 5:
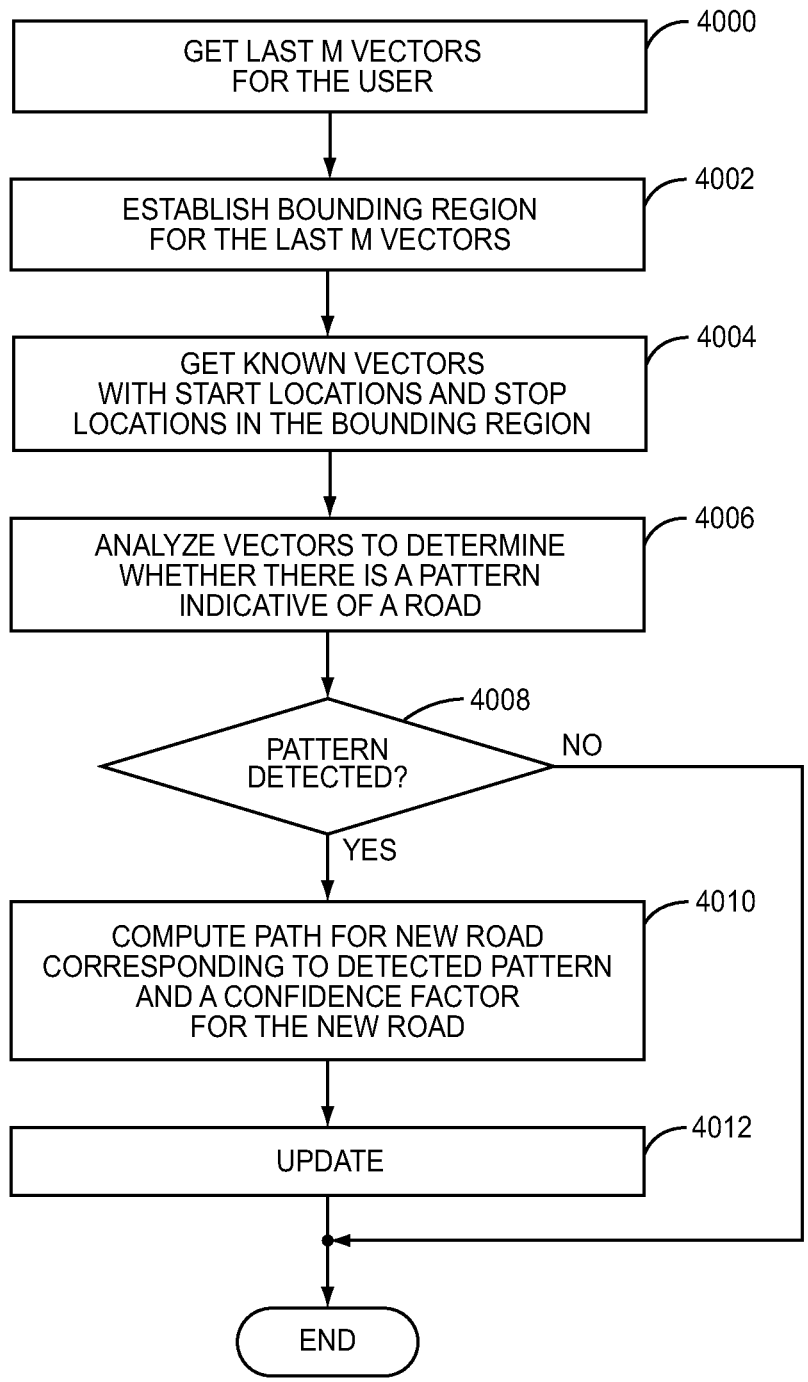
FIG. 5 is a flow chart illustrating a process for detecting a pattern indicative of a new road according to one embodiment of the present disclosure.
Figure 6:
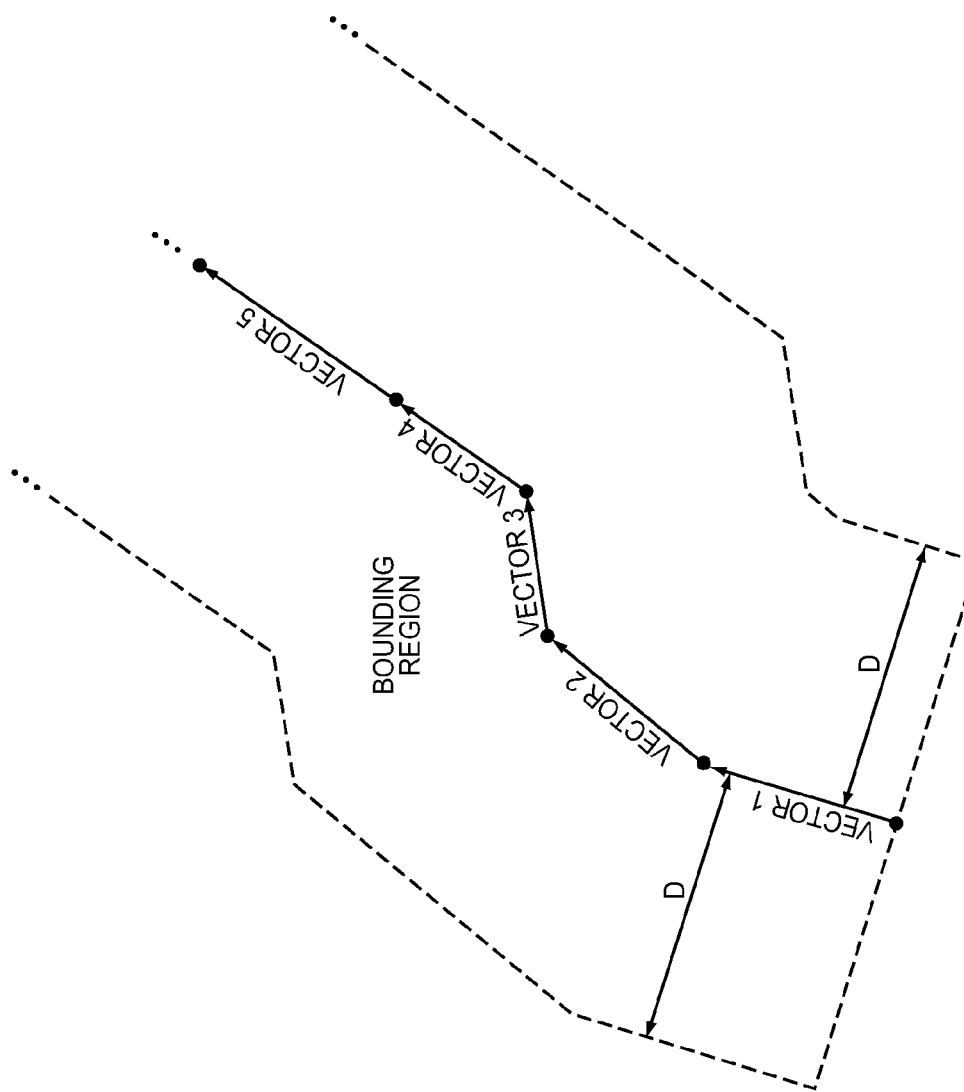
FIG. 6 illustrates an exemplary bounding region utilized during the pattern detection process of FIG. 5 according to one embodiment of the present disclosure.

FIG. 5 is a flow chart illustrating step 3012 of FIG. 4 in more detail according to one embodiment of the present disclosure. First, the map updating function 24 gets the last M vectors from the location history of the user 16-1 stored in the location tracking repository 30 (step 4000). The map updating function 24 then establishes a bounding region for the last M vectors (step 4002). The bounding region is generally a geographic region that encompasses the start and stop locations for the last M vectors for the user 16-1. Preferably, the bounding region is established such that the bounding region is, or is approximately, a geographic region defined by a maximum distance (D) from the last M vectors of the user 16-1, as illustrated in FIG. 6.

Returning to FIG. 5, the map updating function 24 then gets all known vectors from the location tracking repository 30 having start locations and stop locations located within the bounding region for the last M vectors of the user 16-1 (step 4004). Alternatively, the map updating function 24 may get a subset of all known vectors from the location tracking repository 30 having start locations and stop locations located within the bounding region for the last M vectors of the user 16-1, such as all known vectors from the location tracking repository 30 having start locations and stop locations within the bounding region for the last M vectors of the user 16-1 that have time-stamps within a defined time window. The defined time window may be a relative time window such as, for example, the last month.

The map updating function 24 then analyzes the known vectors obtained in step 4004 and, optionally, the last M vectors for the user 16-1 to determine whether there is a pattern of travel or movement that is indicative of a new road (step 4006). For example, the known vectors may be filtered to remove those vectors having directions and, optionally, speeds that are inconsistent with the directions and speeds of the last M vectors for the user 16-1. More specifically, for each known vector, the map updating function 24 may determine to filter the known vector if the direction and optionally speed of the known vector are more than a predefined amount of deviation from the direction and optionally speed of a nearest one of the last M vectors for the user 16-1 (i.e., the one of the last M vectors having a start location and/or stop location that is closest to the start location and/or stop location, respectively, of the known vector). If the direction and, if used, the speed of the known vector are within the predefined amount of deviation from the direction and, if used, the speed of the nearest one of the last M vectors for the user 16-1, then the known vector is not filtered. Once filtering is complete, the remaining known vectors, which are referred to herein as the filtered vectors, are counted. If the number of filtered vectors is greater than a predefined threshold number of vectors, then a pattern is detected. Note that this process for detecting a pattern is exemplary and is not intended to limit the scope of the present disclosure. Any suitable pattern recognition technique may be used.

Once the analysis is complete, the map updating function 24 determines whether a pattern that is indicative of a new road has been detected (step 4008). If not, the process ends. If so, the map updating function 24 computes a path for the new road that corresponds to the detected pattern and, optionally, a confidence factor for the new road (step 4010). In one embodiment, the bounding region for the last M vectors for the user 16-1 is divided into a series of sub-regions. For example, each sub-region may include one of the last M vectors for the user 16-1. Then, for each sub-region, the map updating function 24 may identify vectors from the filtered vectors that have start locations within that sub-region and then combine (e.g., average) the start locations for the identified vectors to provide a combined point for the sub-region. Once complete, the combined points for the sub-regions define the path for the new road. Again, the degree of confidence for the new road may be computed as a function of frequency of use by the users 16-1 through 16-N and how recently the new road has been used by the users 16-1 through 16-N.

In addition, the map updating function 24 may suggest a name for the new road. The map updating function 24 may suggest a name of the road based on detected patterns in the movement of users that have travelled the new road, surrounding roads in the map data model 28, or a combination thereof. The detected patterns in movement may be, for example, an average speed of the users that have travelled the road, start and stop patterns, patterns indicating that the new road extends from an existing road, patterns indicating that the new road merges into an existing road, patterns indicating that the new road extends from and merges back into an existing road, or the like. For example, the average speed at which users have travelled the new road may be used to determine whether the new road is likely to be an Interstate Highway, a city street, or the like. Similarly, start and stop patterns may be used to determine that the new road is a city street. In addition or alternatively, the path of the new road may be analyzed with respect to surrounding roads to determine whether the new road is an extension of an existing road, an alternate version of an existing road (e.g., Alternate I-40 as an alternate for I-40).

Lastly, the map updating function 24 updates the map data model 28 to include data defining the new road (step 4012). In addition, a corresponding update may be provided to one or more of the mobile location-aware devices 14-1 through 14-N and/or the third-party map function 20. At this point, the process ends. Again, in an alternative embodiment, rather than immediately updating the map data model 28, the map updating function 24 may flag the update or otherwise send an alert regarding the update to an owner or editor of the map represented by the map data model 28 for verification before the map is officially updated.

Figure 7:
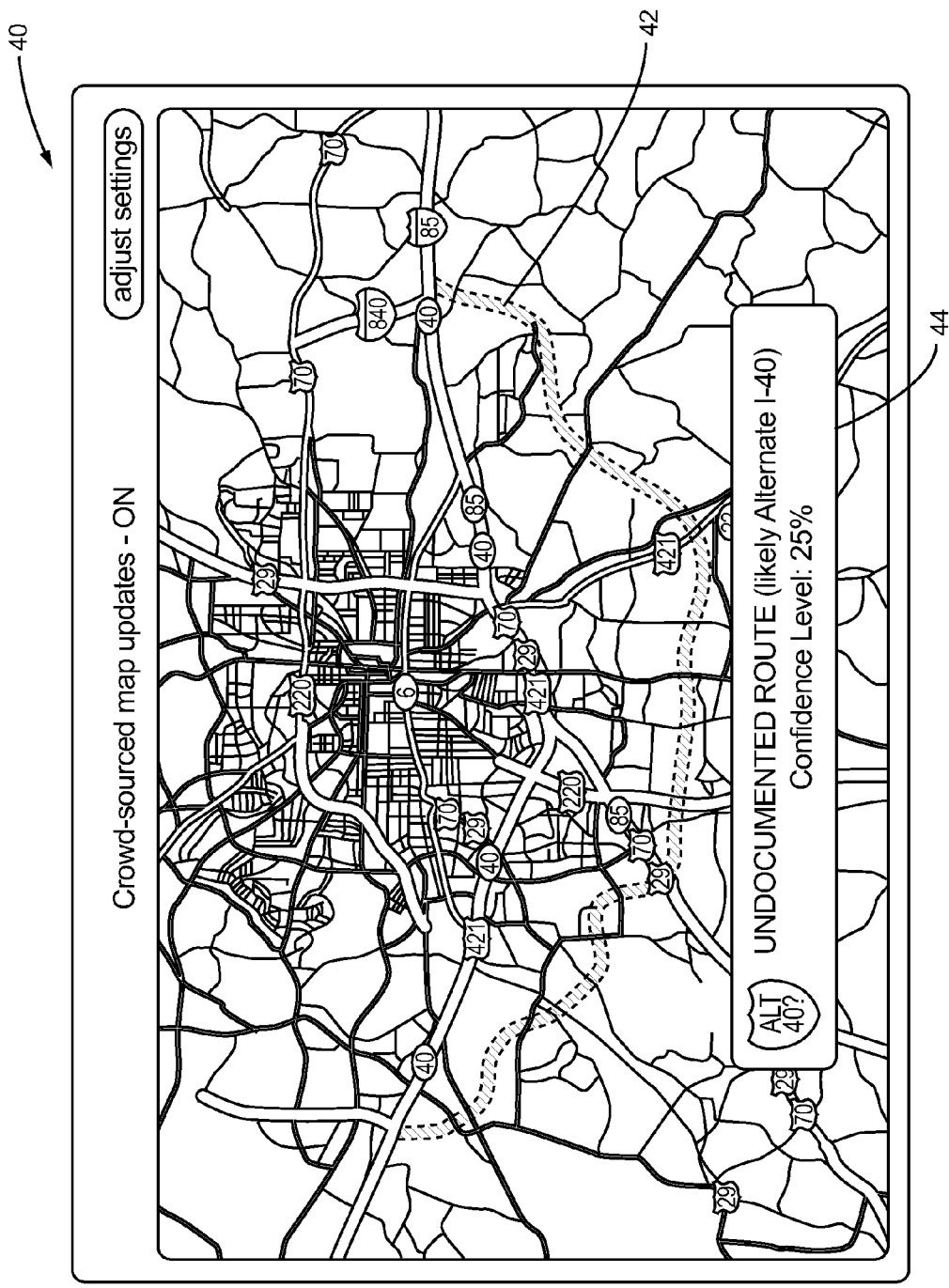
FIG. 7 illustrates an exemplary Graphical User Interface (GUI) for presenting a new road and a degree of confidence for the new road to a user according to one embodiment of the present disclosure.

FIG. 7 illustrates an exemplary Graphical User Interface (GUI) 40 for presenting a map including a crowd-sourced map update provided by the map updating function 24 of the server 12 according to one embodiment of the present disclosure. As illustrated, the GUI 40 generally presents a map, which is preferably a portion of the map defined by the map data model 28 of the server 12. A new road 42 detected by the map updating function 24 of the server 12 based on a detected travel pattern of the users 16-1 through 16-N is shown in the GUI 40. In one embodiment, an opacity of the new road 42 in the GUI 40 corresponds to a degree of confidence for the new road 42 computed by the map updating function 24. In addition or alternatively, the GUI 40 may include a window providing information for the new road 42 such as, for example, the degree of confidence for the new road 42 and a likely, or suggested name, of the new road 42.

In this example, since the new road 42 diverges from I-40 and rejoins I-40, the map updating function 24 determines that the new road 42 is likely an Alternate I-40. More specifically, based on the map data model 28, the map updating function 24 knows that I-40 is an interstate and that characteristic speeds on I-40 are 55 to 80 mph. The map updating function 24 detects a large number of users diverging from I-40 onto the newly detected road at speeds that are characteristic of merging onto another highway. Then, ten miles later, the map updating function 24 detects a large number of users diverging from this newly detected road back onto I-40 at a speed that is characteristic of merging onto another highway. From these characteristic and passively detected inputs, the map updating function 24 is enabled to determine that the newly detected route is likely to be an "Alternate" or "Business Bypass" of I-40 and therefore suggest "Alternate I-40" as a name for the newly detected road.

Figure 8:
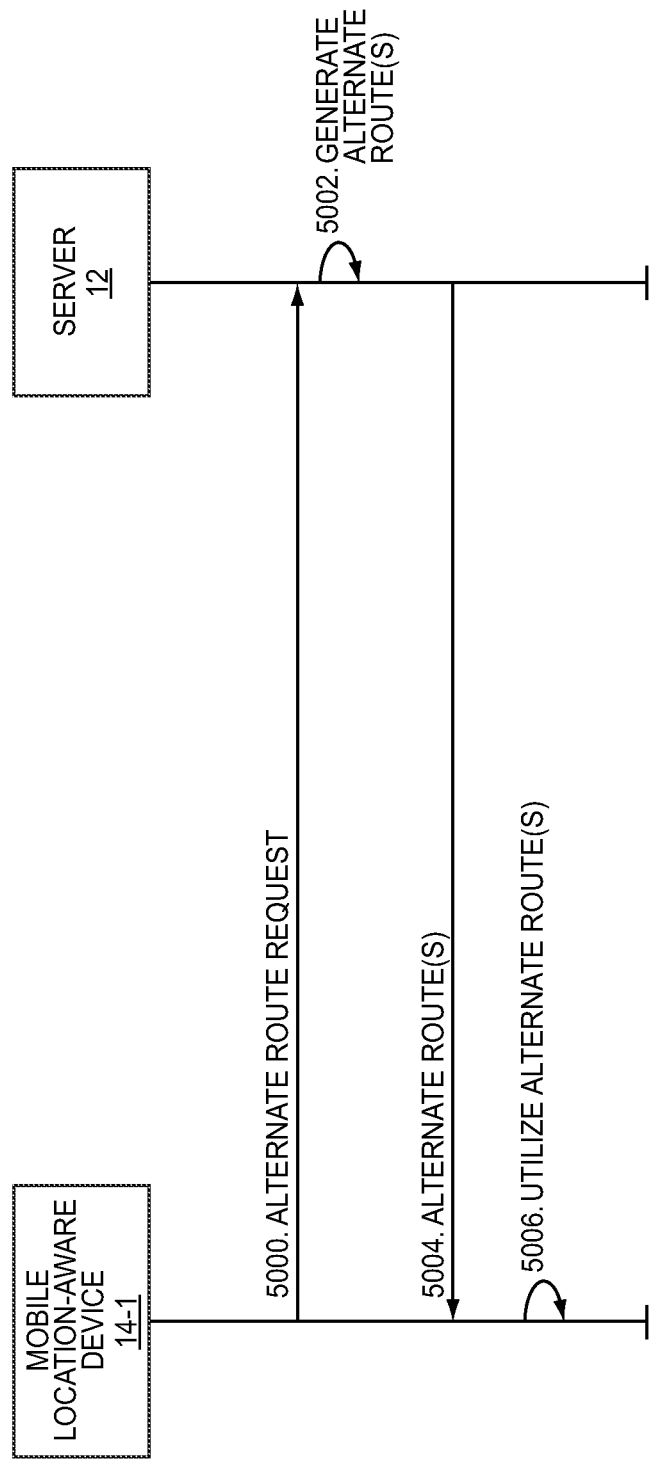
FIG. 8 illustrates the operation of the system of FIG. 1 to provide crowd-sourced alternate route recommendations according to one embodiment of the present disclosure.

FIG. 8 illustrates the operation of the system 10 to recommend alternate routes according to one embodiment of the present disclosure. As illustrated, first, the mobile location-aware device 14-1 sends an alternate route request to the server 12 (step 5000). Note that while the mobile location-aware device 14-1 is the requestor in this discussion, the requestor may alternatively be one of the other mobile location-aware devices 14-2 through 14-N or the third-party map function 20. The alternate route request identifies a desired start location and a desired stop location. More specifically, in one embodiment, the personal navigation function 32-1 sends the alternate route request to the server 12 either automatically in response to a request from the user 16-1 to be navigated from the desired start location to the desired stop location or in response to an explicit request for alternate routes from the user 16-1.

In response to receiving the alternate route request, the alternate route recommendation function 26 of the server 12 generates one or more alternate routes from the desired start location to the desired stop location (step 5002). In general, the alternate route recommendation function 26 utilizes data in the location tracking repository 30 to identify routes previously taken by the users 16-1 through 16-N from the desired start location to the desired stop location. The alternate route recommendation function 26 then selects one or more of the identified routes as alternate routes to recommend, and then returns the alternate routes to the mobile location-aware device 14-1 (step 5004). The personal navigation function 32-1 of the mobile location-aware device 14-1 then utilizes the alternate routes (step 5006). For example, the personal navigation function 32-1 may display the alternate routes to the user 16-1 and enable the user 16-1 to select one of the alternate routes to use. Note that, in an alternative embodiment, rather than immediately sending the alternate routes to the mobile location-aware device 14-1, the recommended routes may be verified, such as by an owner or editor of the map represented by the map data model 28, before the recommended routes are sent to the mobile location-aware device 14-1.

Figure 9:
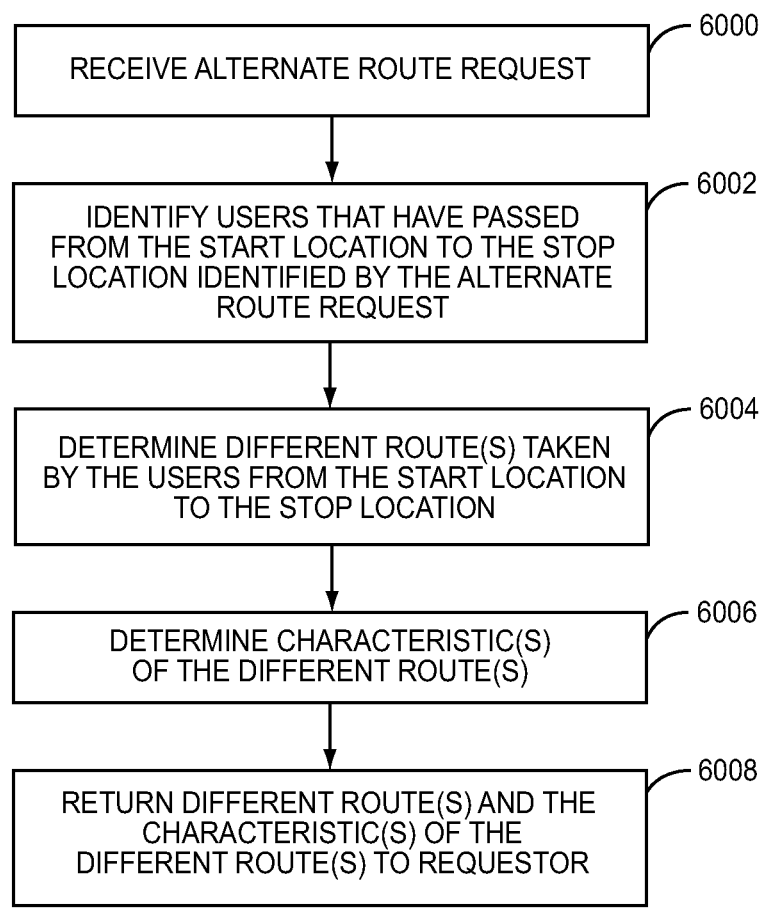
FIG. 9 is a flow chart illustrating a process for generating crowd-sourced alternate route recommendations according to one embodiment of the present disclosure.

FIG. 9 is a flow chart illustrating the operation of the alternate route recommendation function 26 of the server 12 in more detail according to one embodiment of the present disclosure. First, the alternate route recommendation function 26 receives an alternate route request that identifies a desired start location and a desired stop location (step 6000). In response, the alternate route recommendation function 26 identifies users from the users 16-1 through 16-N that have traveled from the desired start location to the desired stop location (step 6002). Note that the users that have traveled from the desired start location to the desired stop location preferably include users that have started at the desired start location and ended at the desired stop location as well as users that have travelled from or through the desired start location to or through the desired stop location. Optionally, the identified users may be only those users that have traveled from the desired start location to the desired stop location during a desired time window. The desired time window may be a reoccurring time window corresponding to a current time of day (e.g., 10 AM to Noon), a current day of the week (Monday, Weekday, or Weekend), a combination of a current or defined time of day and day of week (e.g., Monday from 10 AM to Noon or Weekdays from 10 AM to Noon), or the like.

The alternate route recommendation function 26 then determines one or more different routes taken by the identified users from the desired start location to the desired stop location (step 6004). More specifically, for each of the identified users, the alternate route recommendation function 26 determines a route taken by the identified user from the desired start location to the desired stop location. The routes taken by the identified users are compared to one another to determine a number of different routes taken by the identified users from the desired start location to the desired stop location.

Next, the alternate route recommendation function 26 determines one or more characteristics for each of the different route(s) (step 6006). For each of the different routes, the one or more characteristics for that route may include, for example, a number of the identified users that took that route, an average travel time for that route, an average travel time for that route for desired time window, or the like. The average travel time for a route is determined based on actual travel times for that route for corresponding users determined based on the location histories of those users. Similarly, the average travel time for a route for the desired time window is determined based on actual travel times for that route for corresponding users that travelled that route during the desired time window. The desired time window may be a reoccurring time window corresponding to a current time of day (e.g., 10 AM to Noon), a current day of the week (Monday, Weekday, or Weekend), a combination of a current or defined time of day and day of week (e.g., Monday from 10 AM to Noon or Weekdays from 10 AM to Noon), or the like. The alternate route recommendation function 26 then returns the one or more different routes and the characteristics of the one or more different routes to the requestor as alternate route recommendations (step 6008). Note that either prior to step 6006 or before returning the recommendations in step 6008, the different routes identified in step 6004 may be filtered or otherwise processed to remove unwanted routes. For example, filtering may be performed to remove a particular route that has already been provided to the user 16-1 (e.g., an optimal route that has already been generated by the personal navigation function 32-1 using a traditional route generation technique).

Figure 10:
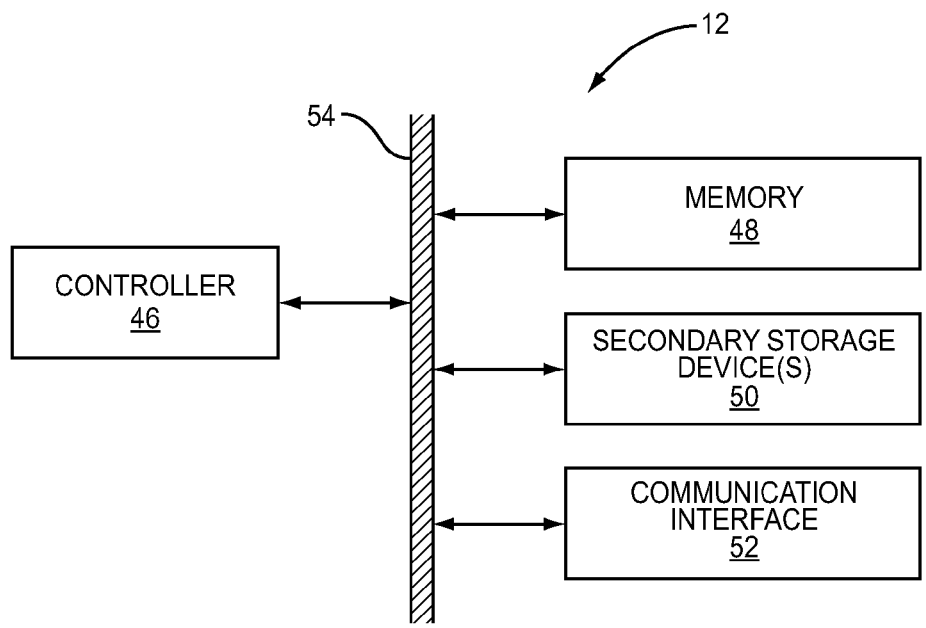
FIG. 10 is a block diagram of the server of FIG. 1 according to one embodiment of the present disclosure.

FIG. 10 is a block diagram of the server 12 according to one embodiment of the present disclosure. As illustrated, the server 12 includes a controller 46 connected to memory 48, one or more secondary storage devices 50, and a communication interface 52 by a bus 54 or similar mechanism. The controller 46 is a microprocessor, digital Application Specific Integrated Circuit (ASIC), Field Programmable Gate Array (FPGA), or the like. In this embodiment, the controller 46 is a microprocessor, and the location tracking function 22, the map updating function 24, and the alternate route recommendation function 26 are implemented in software and stored in the memory 48 for execution by the controller 46. Further, the map data model 28 and the location tracking repository 30 may be stored in the one or more secondary storage devices 50. The secondary storage devices 50 are digital data storage devices such as, for example, one or more hard disk drives. The communication interface 52 is a wired or wireless communication interface that communicatively couples the server 12 to the network 18 (FIG. 1). For example, the communication interface 52 may be an Ethernet interface, local wireless interface such as a wireless interface operating according to one of the suite of IEEE 802.11 standards, or the like.

Figure 11:
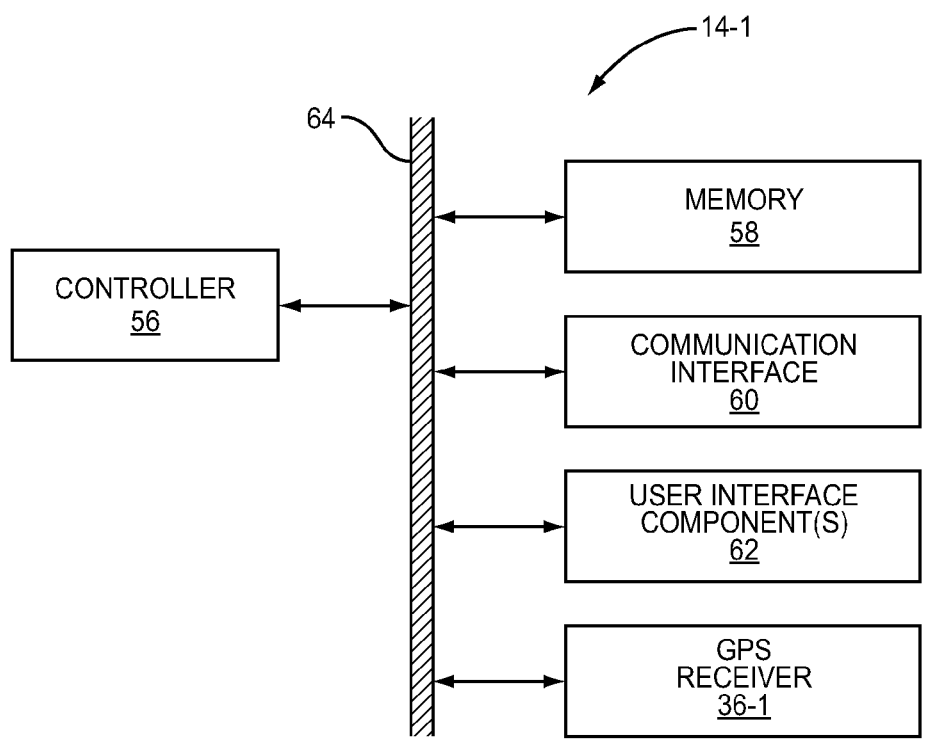
FIG. 11 is a block diagram of one of the mobile location-aware devices of FIG. 1 according to one embodiment of the present disclosure.

FIG. 11 is a block diagram of the mobile location-aware device 14-1 according to one embodiment of the present disclosure. This discussion is equally applicable to the other mobile location-aware devices 14-2 through 14-N. As illustrated, the mobile location-aware device 14-1 includes a controller 56 connected to memory 58, a communication interface 60, one or more user interface components 62, and the GPS receiver 36-1 by a bus 64 or similar mechanism. The controller 56 is a microprocessor, digital ASIC, FPGA, or the like. In this embodiment, the controller 56 is a microprocessor and the location reporting function 34-1 and, in some implementations, the personal navigation function 32-1 are implemented in software and stored in the memory 58 for execution by the controller 56. In this embodiment, the GPS receiver 36-1 is a hardware component. The communication interface 60 is a wireless communication interface that communicatively couples the mobile location-aware device 14-1 to the network 18 (FIG. 1). For example, the communication interface 60 may be a local wireless interface such as a wireless interface operating according to one of the suite of IEEE 802.11 standards, a mobile communications interface such as a cellular telecommunications interface, or the like. The one or more user interface components 62 include, for example, a touchscreen, a display, one or more user input components (e.g., a keypad), a speaker, or the like, or any combination thereof.

Figure 12:
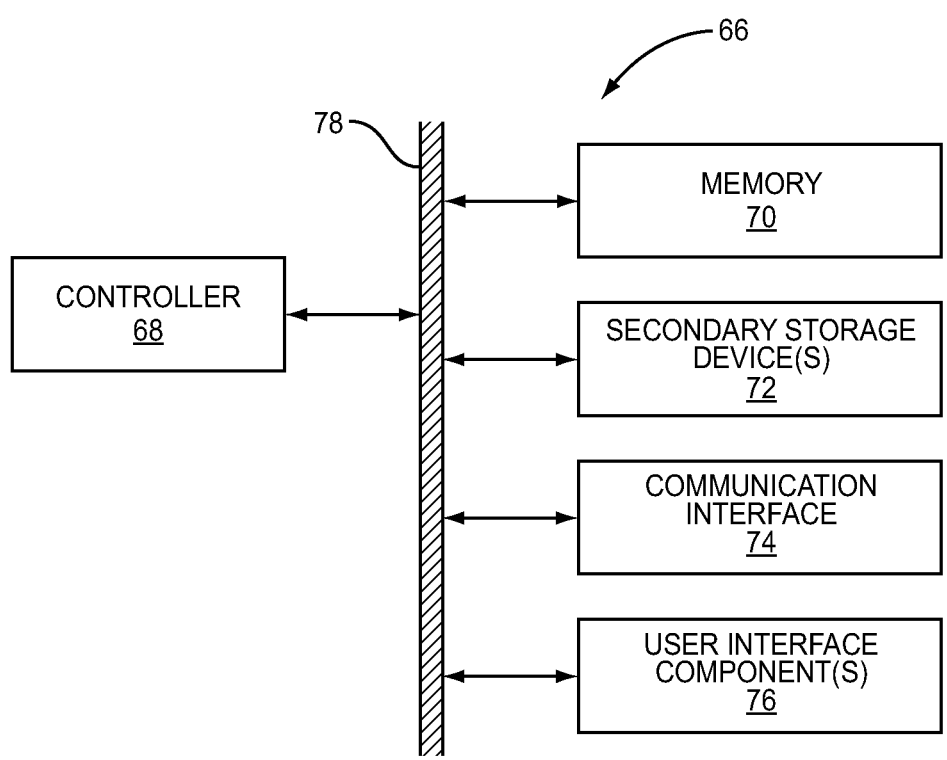
FIG. 12 is a block diagram of a computing device hosting the third-party map function of FIG. 1 according to one embodiment of the present disclosure.

FIG. 12 is a block diagram of a computing device 66 that hosts the third-party map function 20 according to one embodiment of the present disclosure. As illustrated, the computing device 66 includes a controller 68 connected to memory 70, one or more secondary storage devices 72, a communication interface 74, and one or more user interface components 76 by a bus 78 or similar mechanism. The controller 68 is a microprocessor, digital ASIC, FPGA, or the like. In this embodiment, the controller 68 is a microprocessor, and the third-party map function 20 is implemented in software and stored in the memory 70 for execution by the controller 68. The one or more secondary storage devices 72 are digital storage devices such as, for example, one or more hard disk drives. The communication interface 74 is a wired or wireless communication interface that communicatively couples the computing device 66 to the network 18 (FIG. 1).

For example, the communication interface 74 may be an Ethernet interface, local wireless interface such as a wireless interface operating according to one of the suite of IEEE 802.11 standards, a mobile communications interface such as a cellular telecommunications interface, or the like. The one or more user interface components 76 include, for example, a touchscreen, a display, one or more user input components (e.g., a keypad), a speaker, or the like, or any combination thereof.

Those skilled in the art will recognize improvements and modifications to the preferred embodiments of the present invention. All such improvements and modifications are considered within the scope of the concepts disclosed herein and the claims that follow.

What is claimed is:

1. A method comprising:
   tracking locations of a plurality of users of a plurality of mobile location-aware devices over time;
   receiving an alternate route request from a requestor, the alternate route request identifying a desired start location and a desired stop location;
   determining, by a processor, at least one of one or more different routes taken by one or more users of the plurality of users from the desired start location to the desired stop location to provide to the requestor as at least one recommended alternate route, wherein the one or more users includes users other than the requestor and the different routes taken by the one or more users from the desired start location to the desired stop location include routes taken that begin before the desired start location and go through the start location and routes taken that stop beyond the desired stop location and go through the desired stop location; and
   enabling the at least one recommended alternate route to be provided to the requestor.

2. The method of claim 1 comprising:
   identifying the one or more users of the plurality of users that have traveled from the desired start location to the desired stop location based on the tracked locations of the plurality of users of the plurality of mobile location-aware devices; and
   determining, by the processor, the one or more different routes taken by the one or more users from the desired start location to the desired stop location based on the locations of the one or more users.

3. The method of claim 2 wherein identifying the one or more users of the plurality of users that have traveled from the desired start location to the desired stop location comprises identifying one or more users of the plurality of users that have traveled from the desired start location to the desired stop location during a desired time window.

4. The method of claim 3 wherein the desired time window is a reoccurring time window corresponding to at least one of a group consisting of: a current time of day and a current day of the week.

5. The method of claim 1 further comprising:
   determining, for each different route of the at least one of the one or more different routes, a characteristic of the different route; and
   providing the characteristic of each different route to the requestor.

6. The method of claim 5 wherein the characteristic of the different route is at least one of: a number of users of the plurality of users that have traveled the different route, an average travel time for the different route determined based on actual travel times of users of the plurality of users that have traveled the different route, and an average travel time for the different route determined based on actual travel times of users of the plurality of users that have traveled the different route during a desired time window.

7. The method of claim 6 wherein the desired time window is a reoccurring time window corresponding to at least one of a group consisting of: a current time of day and a current day of the week.

8. The method of claim 1 wherein the determining of the at least one of one or more different routes request for alternate routes is provided automatically in response to a subsequent request from the requestor for navigation from a desired start location to a desired stop location.

9. The method of claim 1 wherein the request for alternate routes is provided automatically based on a request of a third party map service.

10. At least one server comprising:
    a communication interface communicatively coupling the server to a plurality of mobile location-aware devices via a network; and
    a controller associated with the communication interface and adapted to:
      track locations of a plurality of users of the plurality of mobile location-aware devices over time;
      receive an alternate route request from a requestor, the alternate route request identifying a desired start location and a desired stop location;
      determine at least one of one or more different routes taken by one or more users of the plurality of users from the desired start location to the desired stop location to provide to the requestor as at least one recommended alternate route, wherein the one or more users includes users other than the requestor and the different routes taken by the one or more users from the desired start location to the desired stop location include routes taken that begin before the desired start location and go through the start location and routes taken that stop beyond the desired stop location and go through the desired stop location; and
      enable the at least one recommended alternate route to be provided to the requestor.

11. The at least one server of claim 10, wherein the controller is further adapted to:
    identify one or more users of the plurality of users that have traveled from the desired start location to the desired stop location based on the locations of the plurality of users of the plurality of mobile location-aware devices; and
    determine the one or more different routes taken by the one or more users from the desired start location to the desired stop location based on the locations of the one or more users.

12. The at least one server of claim 11 wherein in order to identify one or more users of the plurality of users that have traveled from the desired start location to the desired stop location, the controller is further adapted to identify one or more users of the plurality of users that have traveled from the desired start location to the desired stop location during a desired time window.

13. The at least one server of claim 12 wherein the desired time window is a reoccurring time window corresponding to at least one of a group consisting of: a current time of day and a current day of the week.

14. The at least one server of claim 10 wherein the controller is further adapted to:
    determine, for each different route of the at least one of the one or more different routes, a characteristic of the different route; and provide the characteristic of each different route to the requestor.

15. The at least one server of claim 14 wherein the characteristic of the different route is at least one of: a number of users of the plurality of users that have traveled the different route, an average travel time for the different route determined based on actual travel times of users of the plurality of users that have traveled the different route, and an average travel time for the different route determined based on actual travel times of users of the plurality of users that have traveled the different route during a desired time window.

16. The at least one server of claim 15 wherein the desired time window is a reoccurring time window corresponding to at least one of a group consisting of: a current time of day and a current day of the week.

17. The at least one server of claim 10 wherein the determining of the at least one of one or more different routes request for alternate routes is provided automatically in response to a subsequent request from the requestor for navigation from a desired start location to a desired stop location.

18. The at least one server of claim 10 wherein the request for alternate routes is provided automatically based on a request of a third party map service.

19. A non-transitory computer-readable medium storing software for instructing at least one controller of at least one server to:
    track locations of a plurality of users of a plurality of mobile location-aware devices over time;
    receive an alternate route request from a requestor, the alternate route request identifying a desired start location and a desired stop location;
    determine at least one of one or more different routes taken by one or more users of the plurality of users from the desired start location to the desired stop location to provide to the requestor as at least one recommended alternate route, wherein the one or more users includes users other than the requestor and the different routes taken by the one or more users from the desired start location to the desired stop location include routes taken that begin before the desired start location and go through the start location and routes taken that stop beyond the desired stop location and go through the desired stop location; and
    enable the at least one recommended alternate route to be provided to the requestor.

20. The non-transitory computer-readable medium of claim 19 wherein the software further instructs the at least one controller of at least one server to:
    identify the one or more users of the plurality of users that have traveled from the desired start location to the desired stop location based on the locations of the plurality of users of the plurality of mobile location-aware devices; and
    determine the one or more different routes taken by the one or more users from the desired start location to the desired stop location based on the locations of the one or more users.

21. The non-transitory computer-readable medium of claim 20 wherein in order to identify one or more users of the plurality of users that have traveled from the desired start location to the desired stop location, the software further instructs the controller to identify one or more users of the plurality of users that have traveled from the desired start location to the desired stop location during a desired time window.

22. The non-transitory computer-readable medium of claim 21 wherein the desired time window is a reoccurring time window corresponding to at least one of a group consisting of: a current time of day and a current day of the week.

23. The non-transitory computer-readable medium of claim 19 wherein the software further instructs the controller to:
    determine, for each different route of the at least one of the one or more different routes, a characteristic of the different route; and
    provide the characteristic of each different route to the requestor.

24. The non-transitory computer-readable medium of claim 23 wherein the characteristic of the different route is at least one of a number of users of the plurality of users that have traveled the different route, an average travel time for the different route determined based on actual travel times of users of the plurality of users that have traveled the different route, and an average travel time for the different route determined based on actual travel times of users of the plurality of users that have traveled the different route during a desired time window.

25. The non-transitory computer-readable medium of claim 24 wherein the desired time window is a reoccurring time window corresponding to at least one of a group consisting of: a current time of day and a current day of the week.

26. The non-transitory computer-readable medium of claim 19 wherein the determining of the at least one of one or more different routes request for alternate routes is provided automatically in response to a subsequent request from the requestor for navigation from a desired start location to a desired stop location.

27. The non-transitory computer-readable medium of claim 19 wherein the request for alternate routes is provided automatically based on a request of a third party map service.

* * * * *